United States Patent
Nakagaito et al.

(10) Patent No.: US 8,210,950 B2
(45) Date of Patent: Jul. 3, 2012

(54) TORQUE FLUCTUATION ABSORBING APPARATUS

(75) Inventors: Satoshi Nakagaito, Kariya (JP); Tomohiro Saeki, Anjo (JP); Tsutomu Sekine, Susono (JP); Yoshitaka Inoshita, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 276 days.

(21) Appl. No.: 12/476,774

(22) Filed: Jun. 2, 2009

(65) Prior Publication Data
US 2009/0294239 A1 Dec. 3, 2009

(30) Foreign Application Priority Data

Jun. 3, 2008 (JP) .................... 2008-145393

(51) Int. Cl.
*F16D 7/02* (2006.01)
*F16F 15/123* (2006.01)
(52) U.S. Cl. ....................... 464/46; 464/68.41
(58) Field of Classification Search .............. 464/10, 464/45–48, 64.1, 68.4, 68.41, 68.7, 68.8; 192/30 V, 55.1, 56.1, 56.2, 56.6, 213.1–213.12
See application file for complete search history.

(56) References Cited

U.S. PATENT DOCUMENTS

| | | | |
|---|---|---|---|
| 4,732,250 A * | 3/1988 | Maucher et al. | |
| 4,932,921 A * | 6/1990 | Kobayashi et al. | 192/55.1 |
| 5,042,632 A * | 8/1991 | Jackel | 464/45 |
| 5,688,177 A * | 11/1997 | Lindner | 464/68.4 |
| 5,695,032 A * | 12/1997 | Murata et al. | 464/46 |
| 6,012,559 A * | 1/2000 | Yamamoto | 464/68.4 |
| 6,119,839 A * | 9/2000 | Jackel et al. | 192/55.1 |
| 6,601,682 B2 * | 8/2003 | Lehmann et al. | 192/55.1 |
| 6,923,725 B2 | 8/2005 | Takeuchi et al. | |
| 7,238,111 B2 * | 7/2007 | Kintou et al. | 464/46 |
| 7,467,699 B2 * | 12/2008 | Tsuruta et al. | 192/55.1 |
| 2005/0067249 A1 * | 3/2005 | Nakagaito et al. | 192/56.6 |
| 2005/0096138 A1 * | 5/2005 | Takeuchi et al. | 464/46 |
| 2006/0260898 A1 * | 11/2006 | Tsuruta et al. | 192/55.1 |
| 2007/0191118 A1 * | 8/2007 | Saeki et al. | 464/46 |

FOREIGN PATENT DOCUMENTS

JP 2002-13547 A 1/2002
JP 2003-194095 A 7/2003

* cited by examiner

Primary Examiner — Gregory Binda
Assistant Examiner — Josh Skroupa
(74) Attorney, Agent, or Firm — Buchanan Ingersoll & Rooney PC

(57) ABSTRACT

A torque fluctuation absorbing apparatus for absorbing a torque fluctuation generated between an engine and a transmission includes a damper portion having a first plate member, a second plate member and a plurality of coil springs. The second plate member includes a first plate portion and a second plate portion to interpose therebetween the first plate member. The plurality of coil springs is provided between the first and second plate members. The plurality of coil springs is arranged to compress when the first and second plate members move relative to each other thereby absorbing a torque fluctuation generated by a difference between a rotation of the first plate member and a rotation of the second plate member. The first plate member is connected to an output shaft of the engine. The second plate member is connected to an input shaft of the transmission.

20 Claims, 12 Drawing Sheets

F I G. 8
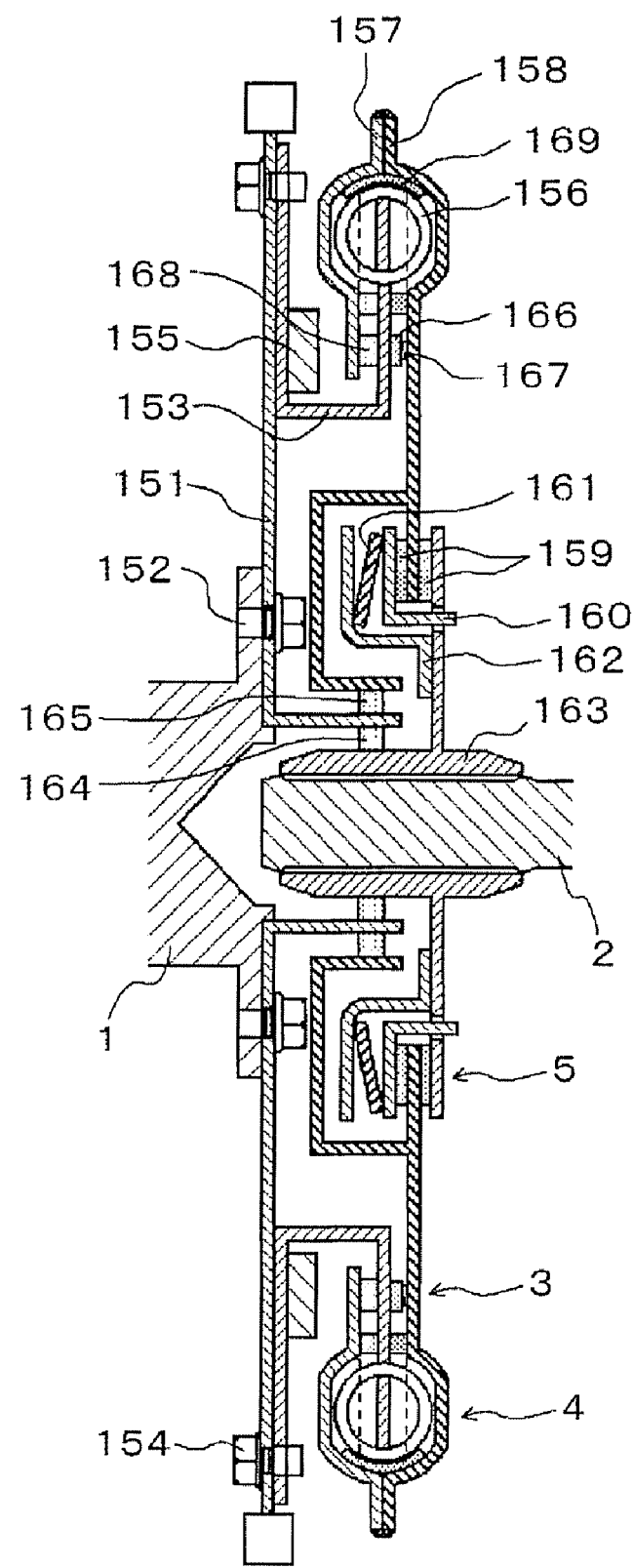

TORQUE FLUCTUATION ABSORBING APPARATUS

CROSS REFERENCE TO RELATED APPLICATIONS

This application is based on and claims priority under 35 U.S.C. §119 to Japanese Patent Application 2008-145393, filed on Jun. 3, 2008, the entire content of which is incorporated herein by reference.

TECHNICAL FIELD

The apparatus disclosed here is a torque fluctuation absorbing apparatus.

BACKGROUND

A torque fluctuation absorbing apparatus is provided at an output shaft of an engine for absorbing (restraining) a torque fluctuation generated between the engine and a transmission of a vehicle as an example. Such torque fluctuation absorbing apparatus generally includes a flywheel, a limiter portion and a damper portion. The flywheel is connected to a crankshaft of the engine. The limiter portion includes a frictional member which is arranged to frictionally engage with the flywheel. The limiter portion is provided at a radially outward portion of the damper portion. A radially inward portion of the damper portion is connected to an input shaft of the transmission. The damper portion is employed for reducing the torque fluctuation inputted from the engine. Examples of a known torque fluctuation absorbing apparatus will be described below.

JP 2003-194095A (hereinafter, referred to as reference 1) discloses a torque fluctuation absorbing apparatus including a flywheel, which is fixedly connected to a driving shaft and to which a driving torque outputted from a power source is transmitted through the driving shaft, and a damper mechanism, which includes a limiter portion having a frictional member operated to directly or indirectly frictionally engage with the flywheel and which is connected to an input shaft of a transmission. According to the reference 1, the torque fluctuation absorbing apparatus further includes a supporting mechanism for fixedly connecting the damper portion to the driving shaft. More specifically, the supporting mechanism supports (interposes therein) the frictional member of the limiter portion in an axial direction of the driving shaft so that the frictional member is in a frictional engagement state before assembling the damper mechanism onto the flywheel, and the damper mechanism is then fixedly connected to the driving shaft. As another structure, the supporting mechanism supports (interposes therein) the frictional member of the limiter portion in the axial direction of the driving shaft so that the frictional member and the flywheel are directly or indirectly frictionally engaged with each other, and the damper mechanism is then fixedly connected to the driving shaft. Further according to the reference 1, the frictional member of the limiter portion is prevented exposing to an external ambience when carrying (transferring) the torque fluctuation absorbing apparatus during the assembly operation. Accordingly, a lubricant, extraneous objects (such as dust), and the like are reduced from being attached to the frictional member as far as possible.

Further, JP2002-13547A (hereinafter, referred to as reference 2) discloses a damper mechanism for a hybrid type actuating apparatus, which is employed for transmitting a driving torque generated by a first power source and/or a second power source while controlling a torque fluctuation generated therebetween. According to the reference 2, the damper mechanism for the hybrid type actuating apparatus includes a limiter mechanism, which interrupts a torque transmission when the torque fluctuation generated between the first and/or second power sources reaches a predetermined value. The damper mechanism according to the reference 2 further includes a first rotational member which is driven to rotate by the first power source, a second rotational member which is connected to the second power source, and a torsion member which controls (restrains) the torque fluctuation generated between the first and second rotational members. Specifically, the limiter mechanism interrupts a torque transmission from the first rotational member to the second rotational member when the torque fluctuation generated therebetween reaches the predetermined value. Still further, an inertial member is provided at the first and/or second rotational members. According to the reference 2, the damper mechanism controls a large torque fluctuation generated between plural power sources without increasing a size and a weight of the torque fluctuation absorbing apparatus.

SUMMARY

According to an aspect of the present invention, a torque fluctuation absorbing apparatus for absorbing a torque fluctuation generated between an engine and a transmission includes a damper portion having a first plate member, a second plate member and a plurality of coil springs. The second plate member includes a first plate portion and a second plate portion to interpose therebetween the first plate member. The plurality of coil springs is provided between the first and second plate members. The plurality of coil springs is arranged to compress when the first and second plate members move relative to each other thereby absorbing a torque fluctuation generated by a difference between a rotation of the first plate and a rotation of the second plate. The first plate member is connected to an output shaft of the engine. The second plate member is connected to an input shaft of the transmission.

According to another aspect of the present invention, a torque fluctuation absorbing apparatus includes a first plate member, a second plate member and a damper portion. The second plate member includes a first plate portion and a second plate portion to interpose therebetween the first plate member. The damper portion allows a relative rotation between the first and second plate members. The first plate member is connected to a first rotational shaft driven to rotate by a power source. The second plate member is connected to a second rotational shaft for outputting a rotation of the first rotational shaft from the torque fluctuation absorbing apparatus.

BRIEF DESCRIPTION OF THE DRAWINGS

FIG. 8 is a cross sectional view schematically illustrating a torque fluctuation absorbing apparatus according to a eighth embodiment;

DETAILED DESCRIPTION

Figure 1:
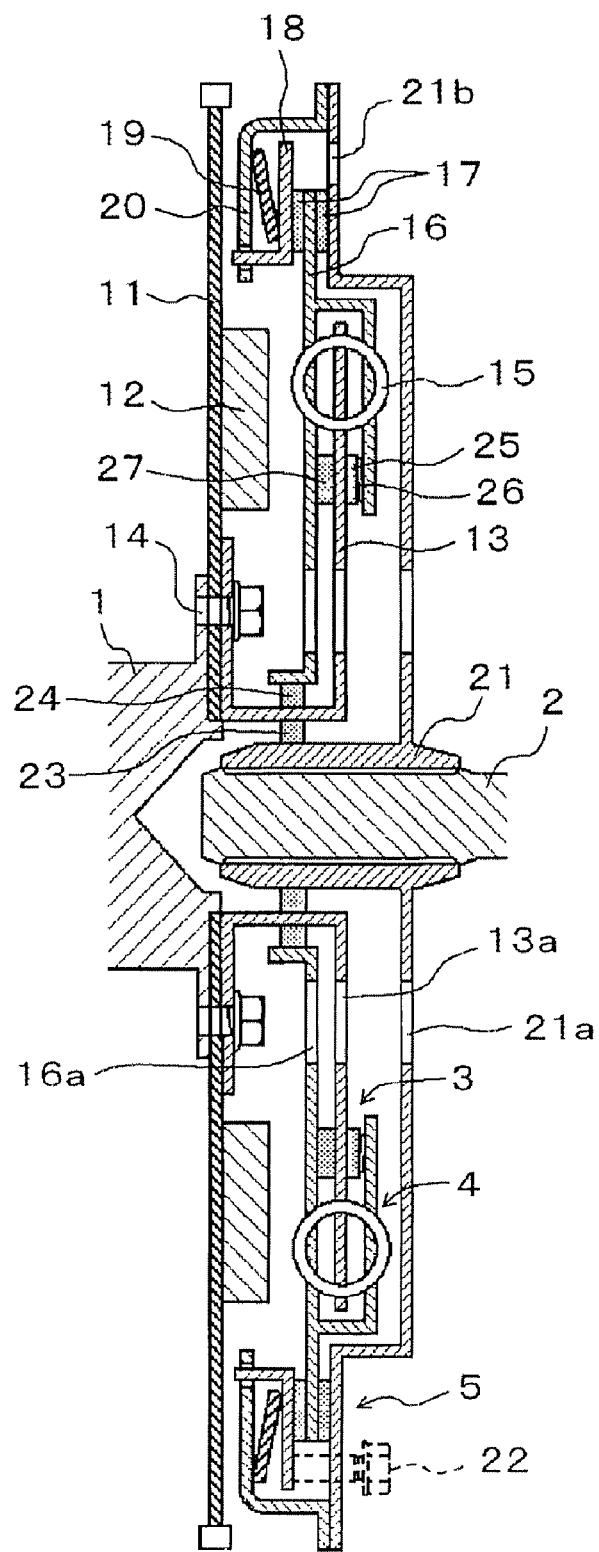
FIG. 1 is a cross sectional view schematically illustrating a torque fluctuation absorbing apparatus according to a first embodiment.

Embodiments of the present invention will be described hereinafter with reference to the attached drawings. According to the embodiments, a torque fluctuation absorbing apparatus includes a damper portion having a first plate member, a second plate member and plural coil springs. The second plate member includes a first plate portion and a second plate portion to interpose therebetween the first plate member. The coil springs are provided between the first and second plate members. When the first and second plate members rotatably move relative to each other, the coil springs compress and accordingly absorb a torque fluctuation generated by a difference between a rotation of the first plate member and a rotation of the second plate member. The first plate member is directly or indirectly connected to an output shaft (serving as a first rotational shaft) of a power source such as an engine, while the second plate member is connected to an input shaft (serving as a second rotational shaft) of a transmission, for example. Hereinafter, a left side of each component in the drawings is referred to as first side, while a right side of each component in the drawings is referred to as second side. Further, "axial direction" corresponds to an axial direction of the output shaft of the engine (the input shaft of the transmission), while "circumferential direction" corresponds to a circumferential direction of each plate member, unless otherwise indicated. Components possessing substantially the same structure will be indicated with the same reference numerals in each embodiment described below.

First Embodiment

A first embodiment of the present invention will be described hereinbelow with reference to FIG. 1.

According to the first embodiment, the torque fluctuation absorbing apparatus is provided between an output shaft (serving as the first rotational shaft) 1 of the engine of a vehicle and an input shaft (serving as the second rotational shaft) 2 of the transmission for absorbing (restraining) a torque fluctuation generated between the engine and the transmission. In a condition where the torque fluctuation absorbing apparatus is mounted on a hybrid type vehicle, for example, an output shaft, which is connected to a planetary gear for transmitting a driving torque of an engine and/or a motor (motor generator) to an axle shaft of the vehicle through the planetary gear, is employed as the second rotational shaft. The torque fluctuation absorbing apparatus includes a hysteresis portion 3, a damper portion 4 and a limiter portion 5 at a torque transmitting path formed between the output shaft 1 of the engine and the input shaft 2 of the transmission. The hysteresis portion 3, the damper portion 4 and the limiter portion 5 serve as a torsion absorbing mechanism. The hysteresis portion 3 generates a frictional torque thereby absorbing a torque fluctuation generated between the output shaft 1 and the input shaft 2. The hysteresis portion 3 includes a structure where a torsional vibration amplitude (torsional angle) generated between the output shaft 1 and the input shaft 2 and/or a torsion speed of input-side members affects a hysteresis value (which indicates the frictional torque) to fluctuate. The damper portion 4 absorbs the torque fluctuation generated between the output shaft 1 and the input shaft 2 by a spring force. The limiter portion 5 generates a skidding when the torque fluctuation equal to or greater than a set value is generated between the output shaft 1 and the input shaft 2.

The torque fluctuation absorbing apparatus further includes a plate member 11, an inertial member 12, a plate member 13, bolts 14, coil springs 15, a plate member 16, frictional members 17, a pressure plate 18, a cone disc spring 19, a support plate 20, a hub member 21, bolts 22, bearing members 23, 24, thrust members 25, 27 and a cone disc spring 26.

The plate member (serving as a first member) 11 is a disc-shaped member which rotates integrally with the output shaft 1. The plate member 11 is assembled, at a radially inward portion thereof, onto an end portion of the output shaft 1 along with the plate member 13 by means of the bolts 14. The inertial member 12 is fixedly provided at a surface of the plate member 11 facing the coil spring 15 (i.e., at a second side surface of the plate member 11).

The inertial member 12 is provided at a radially intermediate portion of the plate member 11 between the bolts 14 and the support plate 20. A weight is employed as the inertial member 12, for example.

The plate member (serving as a second member and also as the first plate member) 13 includes a cylindrical portion and flange portions (first and second side flange portions) respectively formed at both axial ends of the cylindrical portion. The plate member 13 serves a component of the hysteresis portion 3 and the damper portion 4. The first side flange portion (i.e., one flange portion provided at adjacent to the output shaft 1 of the engine) of the plate member 13 is assembled onto the end portion of the output shaft 1 along with the plate member 11 by means of the bolts 14. The plate member 13 is relatively rotatably supported by the hub member 21 at an inner circumferential portion of the cylindrical portion of the plate member 13 via the bearing member 23. Further, the plate member 13 relatively rotatably supports the plate member 16 at an outer circumferential portion of the cylindrical portion of the plate member 13 via the bearing member 24. The second side flange portion (i.e., another flange portion provided at adjacent to the input shaft 2 of the transmission) of the plate member 13 extends radially outwardly from the cylindrical portion thereof so as to be interposed between a disc-shaped portion and a flange portion of the plate member 16. The plate member 13 includes, at the second side flange portion, hole portions (each serving as a first opening portion) 13a for respectively passing therethrough the bolts 14. The second side flange portion of the plate member 13 is sandwiched between the thrust members 25 and 27 and supported thereby so as to be frictionally rotatable relative to the thrust members 25 and 27. The plate member 13 includes, at a radially outward portion of the second side flange portion thereof, plural opening portions for respectively accommodating the coil springs 15. Each coil spring 15 directly or indirectly contacts both end surfaces (end surfaces in the circumferential direction) of the corresponding opening portion of the plate member 13 so as to be separable therefrom.

Each of the bolts 14 serves as a connecting member for connecting the plate member 11 and the plate member 13 to the output shaft 1. The bolts 14 are respectively screwed onto threaded holes formed at the end portion of the output shaft 1 by passing through hole portions 21a of the hub member 21, the hole portions 13a of the plate member 13 and hole portions 16a of the plate member 16 in a sequential order.

Each of the coil springs 15 serves as a component of the damper portion 4. The coil springs 15 are respectively accommodated in the opening portions of the plate member 13 and opening portions formed at the plate member 16. End portions (i.e., end portions in the circumferential direction) of each coil spring 15 directly or indirectly contact the end surfaces (the end surfaces in the circumferential direction) of the corresponding opening portion of the plate member 13 and end surfaces (end surfaces in the circumferential direction) of the corresponding opening portion of the plate member 16 so as to be separable therefrom. When the plate members 13 and 16 rotate relative to each other, each coils spring 15 is compressed and accordingly absorbs a torque fluctuation generated by a difference between a rotation of the plate member 13 and a rotation of the plate member 16. The coil springs 15 are aligned in the circumferential direction of the plate member 13 (the plate member 16) in a serial arrangement or in a parallel arrangement, for example. Each coil spring 15 may be formed in a curved shape along the circumferential direction of the plate member 13 and the plate member 16 in advance. An inertia of output-side members of the damper portion 4, which are provided at a torque transmitting path formed between the coil springs 15 and the input shaft 2 of the transmission, is set to be equal to or greater than 25% of an inertia of the entire torque fluctuation absorbing apparatus. Herein, the output-side members of the damper portion 4 include the pressure plate 16, the frictional member 17, the pressure plate 18, the cone disc spring 19, the support plate 20 and the hub member 21. So configured, a noise absorbing performance and a vibration absorbing performance of the torque fluctuation absorbing apparatus are improved.

The plate member (serving as the second plate member) 16 includes the disc-shaped portion (serving as the first/second portion) and a cylindrical portion formed at an inner circumferential end portion of the disc-shaped portion. Further, the flange portion (serving as the second/first portion) is formed at a radially intermediate portion of the disc-shaped portion of the plate member 16. The radially outward portion of the plate member 13 (i.e., the radially outward portion of the second side flange portion of the plate member 13) is interposed between the flange portion and the intermediate portion of the disc-shaped portion of the plate member 16. The plate member 16 serves as a component of the hysteresis portion 3, the damper portion 4 and the limiter portion 5. An inner circumferential portion of the cylindrical portion of the plate member 16 is supported by the cylindrical portion of the plate member 13 via the bearing member 24 so that the plate member 16 is rotatable relative to the plate member 13. The plate member 16 includes the hole portions (each serving as a second opening portion) 16a for respectively passing therethrough the bolts 14. The thrust member 27 is provided between a first side surface of the plate member 13 (i.e., a first side surface of the second side flange portion of the plate member 13) and the disc-shaped portion of the plate member 16 (i.e., a second side surface of the disc-shaped portion), while the thrust member 25 and the cone disc spring 26 are provided between a second side surface of the plate member 13 (i.e., a second side surface of the second side flange portion of the plate member 13) and the flange portion of the plate member 16 (i.e., a first side surface of the flange portion). Further, the plate member 16 includes the plural opening portions at the flange portion and the disc-shaped portion thereof. More specifically, plural openings are formed at the flange portion of the plate member 16 at a radially outward position further than a position at which the thrust member 25 and the cone disc spring 26 are provided, whereas plural openings are formed at the disc-shaped portion of the plate member 16 at a radially outward position further than a position at which the thrust member 27 is provided so as to respectively correspond to the openings formed at the flange portion. Each opening formed at the flange portion of the plate member 16 and the corresponding opening formed at the disc-shaped portion of the plate member 16 structure each opening portion of the plate member 16 for accommodating each coil spring 15. As described above, each coil spring 15 directly or indirectly contacts the end surfaces (the end surfaces in the circumferential direction) of the corresponding opening portion of the plate member 16 so as to be separable therefrom. A radially outward portion of the plate member 16 (an radially outward portion of the disc-shaped portion of the plate member 16) extends radially outwardly so as to be interposed between the pressure plate 18 and a flange portion of the hub member 21. The frictional members 17 are fixedly connected to both surfaces of the plate member 16 at the radially outward portion thereof by means of rivets, for example.

The frictional members 17 (first and second side frictional members 17) are annular members fixedly connected to the both surfaces of the plate member 16 at the radially outward portion thereof, respectively, by means of reverts, for example. Each frictional member 17 serves as a component of the limiter portion 5. The frictional members 17 relatively rotatably contact the pressure plate 18 and the flange portion of the hub member 21 at frictional surfaces of the frictional members 17.

The pressure plate 18 is an annular member provided between the cone disc spring 19 and one of the frictional members 17 (according to the first embodiment, the first side frictional member 17). The pressure plate 18 serves as a component of the limiter portion 5. The pressure plate 18 is biased towards the frictional members 17 by the cone disc spring 19. The pressure plate 18 is arranged to be axially movable and to be unrotatable relative to the support plate 20. Further, the pressure plate 18 relatively rotatably contacts the first side frictional member 17.

The cone disc spring 19 is provided between the support plate 20 and the pressure plate 18. The cone disc spring 19 biases the pressure plate 18 towards the frictional members 17.

The support plate 20 is an annular plate member formed in a predetermined shape. The support plate 20 serves as a component of the limiter portion 5. The support plate 20 is fixedly connected, at a radially outward portion thereof, to the flange portion of the hub member 21. Further, the support plate 20 is arranged to be axially movable and to be unrotatable relative to the pressure plate 18. The support plate 20 contacts one end (according to the first embodiment, a radially outward end portion) of the cone disc spring 19.

The hub member 21 includes a cylindrical hub portion and a flange portion formed at an outer circumference of the cylindrical hub portion. The hub member 21 serves as a component of the limiter portion 5. An inner circumferential portion of the hub portion of the hub member 21 spline-engages the input shaft 2 so that the hub member 21 is arranged to be integrally rotatable with the input shaft 2. An outer circumferential portion of the hub member 21 rotatably supports the plate member 13 via the bearing member 23. Further, the hub member 21 includes, at the flange portion thereof, the hole portions 21a for respectively passing therethrough the bolts 14. The hub member 21 fixedly supports the support plate 20 at a radially outer portion of the flange portion. Plural hole portions 21b are formed at the hub member 21 at a radially inward portion further than the portion at which the hub member 21 supports the support plate 20. The hub member 21 contacts the other frictional member 17 (according to the first embodiment, the second side frictional member 17) at a radially inward portion further than the portion at which the hole portions 21b are formed, so as to be frictionally rotatable relative to the frictional member 17. The bolts 22 are configured to be respectively screwed onto the hole portions 21b of the hub member 21 so as to release a spring force of the cone disc spring 19 which biases the pressure plate 18 towards the frictional members 17.

The bolts 22 are employed for releasing the spring force of the cone disc spring 19 biasing the pressure plate 18 towards the frictional members 17. Thus, each bolt 22 includes a limiter releasing performance. As described above, the bolts 22 are screwed onto the hole portions 21b of the hub member 21, respectively. Accordingly, assembling and disassembling procedures of the torque fluctuation absorbing apparatus are easily executed.

The bearing member 23 is employed for rotatably supporting the plate member 13 at the outer circumference of the hub portion of the hub member 21. A bush or any possible bearing mechanism may be employed as the bearing member 23. A positional relationship between the hub member 21 and the plate member 13 is determined by the bearing member 23.

The bearing member 24 is employed for rotatably supporting the plate member 16 at the outer circumferential portion of the cylindrical portion of the plate member 13. A bush or any possible bearing mechanism may be employed as the bearing member 24. A positional relationship between the plate members 13 and 16 is determined by the bearing member 24.

The thrust member 25 is a frictional member provided between the plate member 13 and the cone disc spring 26 at a radially inner side position further than a position of each coil spring 15. The thrust member 25 rotatably contacts the plate member 13.

The cone disc spring 26 is a spring member provided between the thrust member 25 and the plate member 16 at a radially inner side position further than the position of each coil spring 15. The cone disc spring 26 biases the thrust member 25 towards the plate member 13.

The thrust member 27 is a frictional member provided between the plate members 13 and 16 at a radially inner side position further than the position of each coil spring 15. The thrust member 27 rotatably contacts the plate members 13 and 16.

According to the first embodiment, the inertia of the input-side members of the damper portion 4 (i.e., an inertia of the plate member 11, the inertial member 12, the plate member 13, and the bolts 14) is set to be lower, whereas the inertia of the output-side members of the damper portion 4 (i.e., the inertia of the plate member 16, the frictional member 17, the pressure plate 18, the cone disc spring 19, the support plate 20 and the hub member 21) is set to be higher. Accordingly, the damping performance of the damper portion 4 is satisfactory obtained.

Further, the inertia of the output-side members of the damper portion 4 is set to be high while restraining the inertia of the input-side members of the damper portion 4 and a total weight of the torque fluctuation absorbing apparatus. Accordingly, an acceleration performance of the vehicle is not deteriorated.

Still further, the torque fluctuation absorbing apparatus is assembled onto the output shaft 1 by inserting the bolts 14 from a transmission side (from a right side in FIG. 1, i.e., from the second side). Thus, the structure of the torque fluctuation absorbing apparatus according to the first embodiment simplifies an assembling procedure for assembling the torque fluctuation absorbing apparatus onto the output shaft 1.

Second Embodiment

Figure 2:
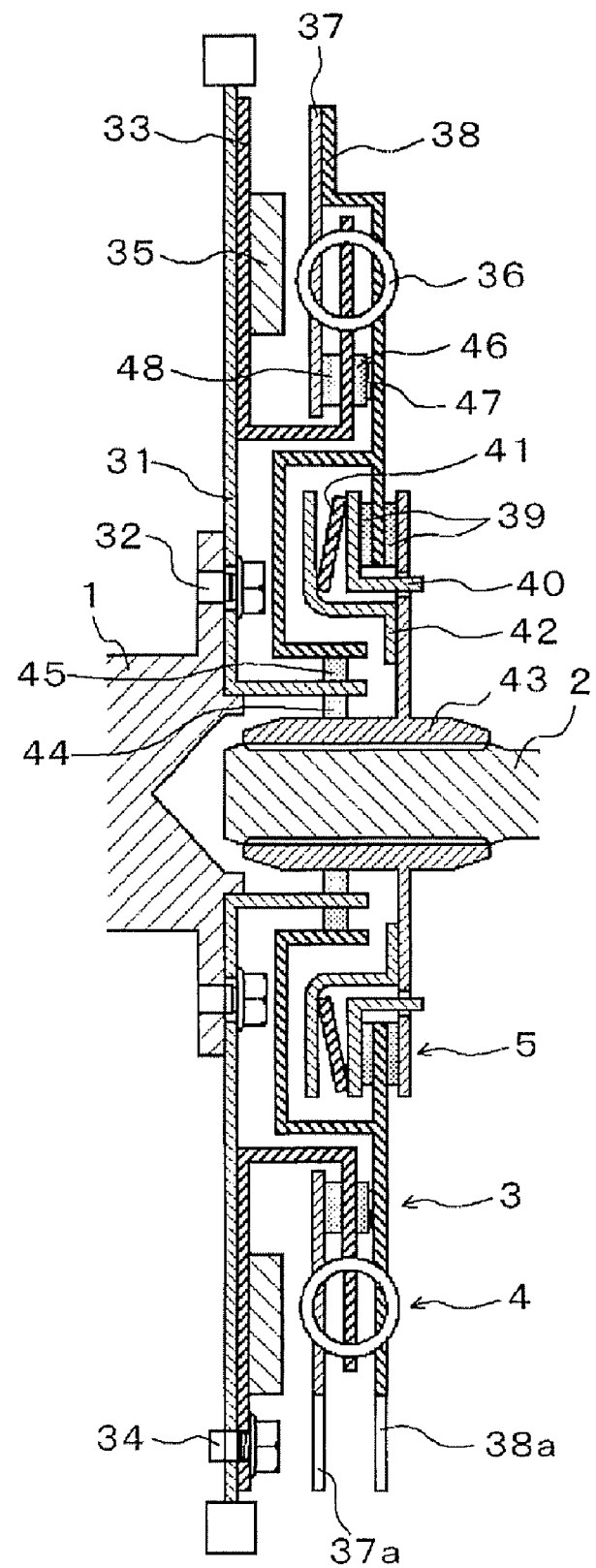
FIG. 2 is a cross sectional view schematically illustrating a torque fluctuation absorbing apparatus according to a second embodiment.

A second embodiment of the present invention will be described hereinbelow with reference to FIG. 2.

According to the second embodiment, the torque fluctuation absorbing apparatus includes a plate member 31, bolts 32, a plate member 33, bolts 34, an inertial member 35, coil springs 36, a plate member 37, a plate member 38, frictional members 39, a pressure plate 40, a cone disc spring 41, a support plate 42, a hub member 43, bearing members 44, 45, thrust members 46, 48 and a cone disc spring 47.

The plate member (serving as the first member) 31 includes a cylindrical portion and a flange portion formed at one end (a first side end) of the cylindrical portion. The plate member 31 rotates integrally with the output shaft 1. The plate member 31 is rotatably supported, at an inner circumferential portion of the cylindrical portion thereof, by the hub member 43 via the bearing member 44. Further, the plate member 31 rotatably supports, at an outer circumferential portion of the cylindrical portion thereof, the plate member 38 via the bearing member 45. The plate member 31 is assembled, at a radially inward portion of the flange portion thereof, onto the end portion of the output shaft 1 by means of the bolts 32. Further, the plate member 31 is fixedly connected, at a radially outward portion of the flange portion thereof, to the plate member 33 so as to be integral therewith by means of the bolts 34.

Each of the bolts 32 serves as a connecting member for connecting the plate member 31 to the output shaft 1. The bolts 32 are respectively screwed onto the threaded holes formed at the end portion of the output shaft 1 before fixing the plate member 33 to the plate member 31 by means of the bolts 34.

The plate member (serving as the second member and also as the first plate member) 33 includes a cylindrical portion and flange portions (first and second side flange portions) respectively formed at axial ends of the cylindrical portion. The plate member 33 serves as a component of the hysteresis portion and the damper portion 4. The first side flange portion (i.e., one flange portion provided at adjacent to the output shaft 1 of the engine) of the plate member 33 is assembled onto the plate member 31 by means of the bolts 34. The inertial member 35 is fixedly connected to the plate member 33 at a radially inward portion further than the portion at which the bolts 34 are provided. The second side flange portion (i.e., another flange portion provided at adjacent to the input shaft 2 of the transmission) of the plate member 33 extends radially outwardly from the cylindrical portion so as to be interposed between the plate member 37 and the plate member 38. The second side flange portion of the plate member 33 is sandwiched between the thrust members 46 and 48 and supported thereby so as to be frictionally rotatable relative to the thrust members 46 and 48. Plural opening portions are provided at a radially outward portion of the second side flange portion of the plate member 33 for accommodating the coil springs 36. Each coil spring 36 directly or indirectly contacts both end surfaces (end surfaces in the circumferential direction) of the corresponding opening portion of the plate member 33 so as to be separable therefrom.

Each of the bolts 34 serves as a connecting member for connecting the plate member 33 to the plate member 31. The bolts 34 are respectively screwed onto threaded holes formed at the plate member 31 by passing through cutout portions 38a formed at the plate member 38 and cutout portions 37a formed at the plate member 37.

The inertial member 35 is provided at the first side flange portion of the plate member 33. A weight is employed as the inertial member 35, for example.

Each of the coil springs 36 serves as a component of the damper portion 4. The coil springs 36 are respectively accommodated in the opening portions of the plate member 33, opening portions formed at the plate member 37 and opening portions formed at the plate member 38. End portions (i.e., end portions in the circumferential direction) of each coil spring 36 directly or indirectly contact the end surfaces (the end surfaces in the circumferential direction) of the corresponding opening portion of the plate member 33 and end surfaces (end surfaces in the circumferential direction) of the corresponding opening portions of the plate members 37 and 38 so as to be separable therefrom. When the plate member 33 and the plate member 37 (the plate member 38) rotate relative to each other, each coil spring 36 is compressed and accordingly absorbs a torque fluctuation generated by a difference between a rotation of the plate member 33 and a rotation of the plate member 37 (a rotation of the plate member 38 which rotate integrally with the plate member 37). An inertia of the output-side members of the damper portion 4, which are provided at a torque transmitting path formed between the coil springs 36 and the input shaft 2 of the transmission, is set to be equal to or greater than 25% of the inertia of the entire torque fluctuation absorbing apparatus. Herein, the output-side members of the damper portion 4 include the plate members 37 and 38, the frictional members 39, the pressure plate 40, the cone disc spring 41, the support plate 42 and the hub member 43. So configured, a noise absorbing performance and a vibration absorbing performance of the torque fluctuation absorbing apparatus are improved.

The plate member (serving as the second plate member and also as the first/second plate portion of the second plate member) 37 is formed in a disc shape. The plate member 37 is provided at a first side of the second side flange portion of the plate member 33, i.e., at a second side of the first side flange portion of the plate member 37, so as to face the inertial member 35. The plate member 37 serves as a component of the hysteresis portion 3 and the damper portion 4. The plate member 37 is fixedly connected, at the radially outward portion thereof, to the plate member 38. The plate member 37 includes, at the radially outward portion thereof, the cutout portions 37a for respectively passing therethrough the bolts 34. The plate member 37 further includes, at a radially intermediate portion thereof, the plural opening portions for respectively accommodating the coil springs 36. As described above, each coil spring 36 directly or indirectly contacts the end surfaces (the end surfaces in the circumferential direction) of the corresponding opening portion of the plate member 37 so as to be separable therefrom. The plate member 37 rotatably contacts the thrust member 48 at a radially inward portion.

The plate member (serving as the second plate member) 38 includes a cylindrical portion and a flange portion (serving as the second/first plate portion of the second plate member) formed in a predetermined shape. The flange portion of the plate member 38 extends from an end portion (according to the second embodiment, a first side end) of the cylindrical portion of the plate member 38. The plate member 38 serves as a component of the hysteresis portion 3, the damper portion 4 and the limiter portion 5. An inner circumferential portion of the cylindrical portion of the plate member 38 is supported by the cylindrical portion of the plate member 31 via the bearing member 45 so that the plate member 38 is rotatable relative to the plate member 31. The plate member 38 further includes an extending portion which extends radially inwardly from a predetermined position of the flange portion. The frictional members 39 are provided at both surfaces of the extending portion of the plate member 38 by means of rivets, for example. The plate member 38 is connected, at a radially outward portion of the flange portion thereof, to the plate member 37. The plate member 38 includes, at the radially outward portion of the flange portion, the plural cutout portions 38a for respectively passing therethrough the bolts 34. The plate member 38 further includes, at the flange portion thereof, the plural opening portions for respectively accommodating the coil springs 36. As described above, each coil spring 36 directly or indirectly contacts the end surfaces (the end surfaces in the circumferential direction) of the corresponding opening portion of the plate member 38 so as to be separable therefrom. The plate member 38 supports one end portion of the cone disc spring 47 at the flange portion.

The frictional members 39 (first and second frictional members 39) are annular members respectively fixedly connected to the both surfaces of the flange portion of the plate member 38 at the extending portion thereof by means of rivets, for example. Each frictional member 39 serves as a component of the limiter portion 5. The frictional members 39 relatively rotatably contact, at frictional surfaces thereof, the pressure plate 40 and the flange portion of the hub member 43.

The pressure plate 40 is an annular member provided between the cone disc spring 41 and one of the frictional members 39 (according to the second embodiment, the first side frictional member 39 provided at adjacent to the output shaft 1 of the engine). The pressure plate 40 serves as a component of the limiter portion 5. The pressure plate 40 is biased towards the frictional members 39 by the cone disc spring 41. The pressure plate 40 is arranged to be axially movable and to be unrotatable relative to the flange portion of the hub member 43. Further, the pressure plate 40 relatively rotatably contacts the first side frictional member 39.

The cone disc spring 41 is provided between the support plate 42 and the pressure plate 40. The cone disc spring 41 biases the pressure plate 40 towards the frictional members 39.

The support plate 42 is an annular plate member formed in a predetermined shape. The support plate 42 serves as a component of the limiter portion 5. The support plate 42 is fixedly connected, at a radially inward portion thereof, to the flange portion of the hub member 43. The support plate 42 contacts one end (according to the second embodiment, a radially inward end) of the cone disc spring 41.

The hub member 43 includes a cylindrical hub portion and the flange portion formed at an outer circumference of the cylindrical hub portion. The hub member 43 serves as a component of the limiter portion 5. An inner circumferential portion of the hub portion of the hub member 43 spline-engages the input shaft 2 so that the hub member 43 is arranged to be unrotatable relative to the input shaft 2. An outer circumferential portion of the hub member 43 rotatably supports the plate member 31 via the bearing member 44. Further, the hub member 43 fixedly supports, at a radially inward portion of the flange portion thereof, the support plate 42. Still further, the hub member 43 supports the pressure plate 40 at a radially outward portion further than the portion at which the support plate 42 is supported so that the pressure plate 40 is arranged to be axially movable and to be unrotatable relative to the hub member 43. Still further, the hub member 43 rotatably contacts the other frictional member 39 (the second side frictional member 39 which is provided at adjacent to the input shaft 2 of the transmission) at a radially outward portion further than the portion at which the pressure plate 40 is supported.

The bearing member 44 is employed for rotatably supporting the plate member 31 at the outer circumferential portion of the hub portion of the hub member 43. A bush or any possible bearing mechanism may be employed as the bearing member 44. A positional relationship between the hub member 43 and the plate member 31 is determined by the bearing member 44.

The bearing member 45 is employed for rotatably supporting the plate member 38 at the outer circumferential portion of the cylindrical portion of the plate member 31. A bush or any possible bearing mechanism may be employed as the bearing member 44. A positional relationship between the plate members 31 and 38 is determined by the bearing member 45.

The thrust member 46 is a frictional member provided between the plate member 33 and the cone disc spring 47 at a radially inner side position further than a position of each coil spring 36. The thrust member 46 rotatably contacts the plate member 33.

The cone disc spring 47 is a spring member provided between the thrust member 46 and the plate member 38 at a radially inner side position further than the position of each coil spring 36. The cone disc spring 47 biases the thrust member 46 towards the plate member 33.

The thrust member 48 is a frictional member provided between the plate members 33 and 37 at a radially inner side position further than the position of each coil spring 36. The thrust member 48 rotatably contacts the plate members 33 and 37.

According to the second embodiment, the same effect is obtained as the first embodiment.

Third Embodiment

Figure 3:
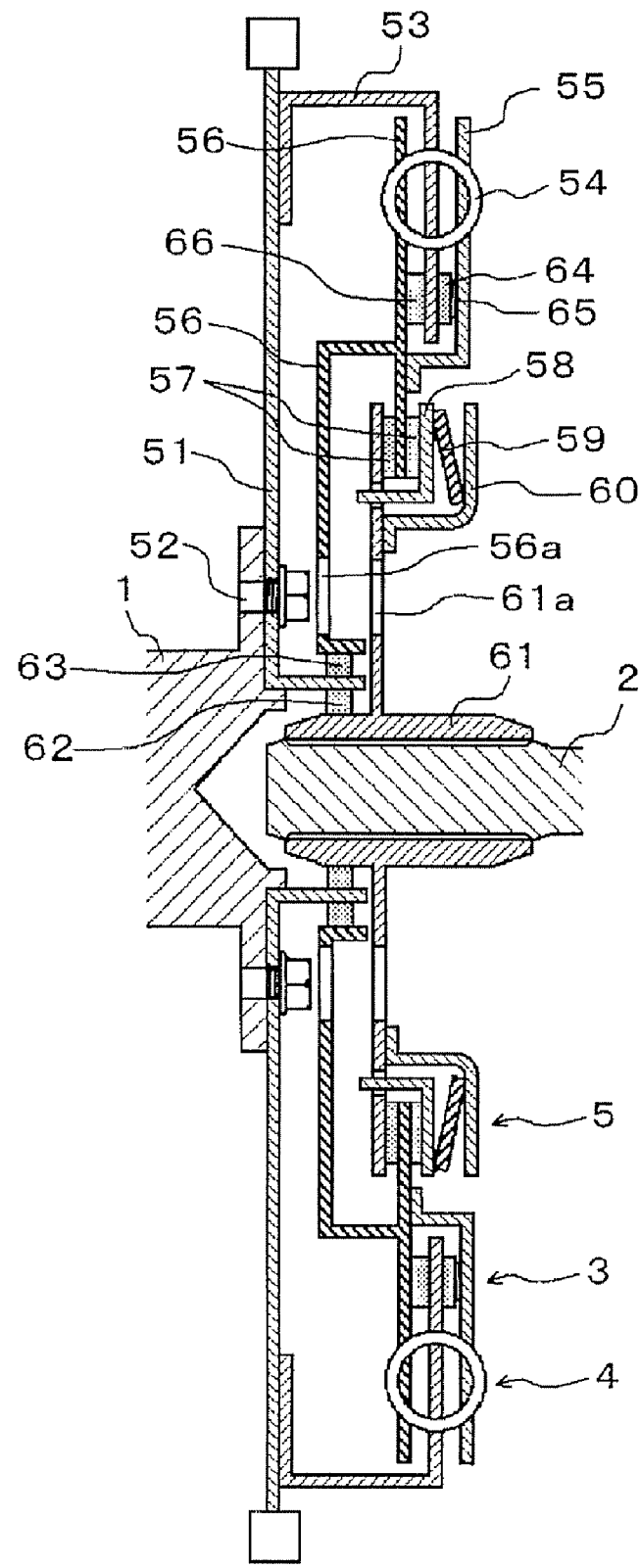
FIG. 3 is a cross sectional view schematically illustrating a torque fluctuation absorbing apparatus according to a third embodiment.

A third embodiment of the present invention will be described hereinbelow with reference to FIG. 3.

According to the third embodiment, the torque fluctuation absorbing apparatus includes a plate member 51, bolts 52, a plate member 53, coil springs 54, a plate member 55, a plate member 56, frictional members 57, a pressure plate 58, a cone disc spring 59, a support plate 60, a hub member 61, bearing members 61, 62, thrust members 64, 65 and a cone disc spring 65.

The plate member 51 includes a cylindrical portion and a flange portion formed at one end portion of the flange portion. The plate member 51 rotates integrally with the output shaft 1. The plate member 51 is supported, at an inner circumferential portion of the cylindrical portion thereof, by the hub member 61 via the bearing member 62 so that the plate member 51 is arranged to be rotatable relative to the hub member 62. Further, the plate member 51 supports, at an outer circumferential portion of the cylindrical portion thereof, the plate member 56 via the bearing member 63 so that the plate member 56 is arranged to be rotatable relative to the plate member 51. The plate member 51 is assembled, at a radially inward portion thereof, onto the end portion of the output shaft 1 of the engine by means of the bolts 52. The plate member 53 is fixedly connected to a radially outward portion of the plate member 51 (at a radially outward portion of the flange portion thereof).

Each of the bolts 52 serves as a connecting member for connecting the plate member 51 to the output shaft 1. The bolts 52 are respectively screwed onto the threaded holes formed at the end portion of the output shaft 1 by passing through hole portions 61*a* of the hub member 61 and hole portions 56*a* of the plate member 56 in a sequential order.

The plate member (serving as the first plate member) 53 includes a cylindrical portion and flange portions (first and second side flange portions) respectively formed at both axial ends of the cylindrical portion. The plate member 35 serves as a component of the hysteresis portion 3 and the damper portion 4. The first side flange portion (i.e., one flange portion provided at adjacent to the output shaft 1 of the engine) of the plate member 53 is fixedly connected to the plate member 51. The second side flange portion (i.e., another flange portion provided at adjacent to the input shaft 2 of the transmission) of the plate member 53 extends radially outwardly from the cylindrical portion so as to be interposed between the plate member 55 and the plate member 56. Plural opening portions are provided at a radially outward portion of the second side flange portion of the plate member 53 for accommodating the coil springs 54. Each coil spring 54 directly or indirectly contacts both end surfaces (end surfaces in a circumferential direction) of the corresponding opening portion of the plate member 53 so as to be separable therefrom. A radially inward portion of the second side flange portion of the plate member 53 is sandwiched between the thrust member 64 and the thrust member 66 and supported thereby so as to be frictionally rotatable relative to the thrust members 64 and 66.

Each of the coil springs 54 serves as a component of the damper portion 4. The coil springs 54 are respectively accommodated in the opening portions of the plate member 53, opening portions formed at the plate member 55 and opening portions formed at the plate member 56. End portions (i.e., end portions in the circumferential direction) of each coil spring 54 directly or indirectly contact the end surfaces (the end surfaces in the circumferential direction) of the corresponding opening portion of the plate member 53, the plate member 55 and of the plate member 56 so as to be separable therefrom. When the plate member 53 and the plate member 55 (the plate member 56) rotate relative to each other, each coil spring 54 is compressed and accordingly absorbs a torque fluctuation generated by a difference between a rotation of the plate member 53 and a rotation of the plate member 55 (a rotation of the plate member 56 which rotate integrally with the plate member 55). An inertia of the output-side members of the damper portion 4, which are provided at the torque transmitting path formed between the coil springs 54 and the input shaft 2 of the transmission, is set to be equal to or greater than 25% of the inertia of the entire torque fluctuation absorbing apparatus. Herein, the output-side members of the damper portion 4 include the plate members 55 and 56, the frictional members 57, the pressure plate 58, the cone disc spring 59, the support plate 60 and the hub member 61. So configured, a noise absorbing performance and a vibration absorbing performance of the torque fluctuation absorbing apparatus are improved.

The plate member (serving as the second plate member and also as the first/second plate portion of the second plate member) 55 is an annular member provided at a second side (i.e., at a side adjacent to the input shaft 2 of the transmission) of the plate member 56. The plate member 55 serves as a component of the hysteresis portion 3 and the damper portion 4. The plate member 55 is fixedly connected, at a radially inward portion thereof, to the plate member 56. The plate member 55 includes, at a radially intermediate portion thereof, the plural opening portions for respectively accommodating the coil springs 54. As described above, each coil spring 54 directly or indirectly contacts the end surfaces (the end surfaces in the circumferential direction) of the corresponding opening portion of the plate member 55 so as to be separable therefrom. The plate member 55 supports one end of the cone disc spring 65.

The plate member (serving as the second plate member) 56 includes a cylindrical portion and a flange portion (serving as the second/first plate portion of the second plate member) formed in a predetermined shape. The flange portion of the plate member 56 extends from an end portion (according to the third embodiment, a first side end) of the cylindrical portion of the plate member 56. The plate member 56 serves as a component of the hysteresis portion 3, the damper portion 4 and the limiter portion 5. A radially inward portion of the cylindrical portion of the plate member 56 is supported by the cylindrical portion of the plate member 51 via the bearing member 63 so that the plate member 56 is rotatable relative to the plate member 51. The plate member 56 includes, at a radially inward portion of the flange portion thereof, the plural hole portions 56a for respectively passing therethrough the bolts 52. The plate member 56 further includes an extending portion which extends radially inwardly from a predetermined position of the flange portion. The frictional members 57 are fixedly provided at both surfaces of the extending portion of the plate member 56 by means of rivets, for example. The plate member 56 is connected, at a radially intermediate portion of the flange portion thereof, to the plate member 55. Further, the plate member 56 includes, at a radially outward portion thereof (i.e. at a radially outward portion of the flange portion thereof), the plural opening portions for respectively accommodating the coil springs 54. As described above, each coil spring 54 directly or indirectly contacts the end surfaces (the end surfaces in the circumferential direction) of the corresponding opening portion of the plate member 56 so as to be separable therefrom. The flange portion of the plate member 56 rotatably contacts the thrust member 66.

The frictional members 57 (first and second frictional members 57) are annular members fixedly connected to both surfaces of the extending portion of the flange portion of the plate member 56 by means of rivets, for example. Each frictional member 57 serves as a component of the limiter portion 5. The frictional members 57 relatively rotatably contact, at frictional surfaces thereof, the pressure plate 58 and the flange portion of the hub member 61.

The pressure plate 58 is an annular member provided between the cone disc spring 59 and one of the frictional members 57 (according to the third embodiment, the second side frictional member 57 provided at adjacent to the input shaft 2 of the transmission). The pressure plate 58 serves as a component of the limiter portion 5. The pressure plate 58 is biased towards the frictional members 57 by the cone disc spring 59. The pressure plate 58 is arranged to be axially movable and to be unrotatable relative to the flange portion of the hub member 61. Further, the pressure plate 58 relatively rotatably contacts the second side frictional member 57.

The cone disc spring 59 is provided between the support plate 60 and the pressure plate 58. The cone disc spring 59 biases the pressure plate 58 towards the frictional members 57.

The support plate 60 is an annular plate member formed in a predetermined shape. The support plate 60 serves as a component of the limiter portion 5. The support plate 60 is fixedly connected, at a radially inward portion thereof, to the flange portion of the hub member 61. The support plate 60 contacts one end (according to the third embodiment, a radially inward end) of the cone disc spring 59.

The hub member 61 includes a cylindrical hub portion and the flange portion formed at an outer circumference of the cylindrical hub portion. The hub member 61 serves as a component of the limiter portion 5. An inner circumferential portion of the hub portion of the hub member 61 spline-engages the input shaft 2 of the transmission so that the hub member 61 is arranged to be unrotatable relative to the input shaft 2. An outer circumferential portion of the hub member 61 rotatably supports the plate member 51 via the bearing member 62. The hub member 61 includes the hole portions 61a for respectively passing therethrough the bolts 52. The hub member 61 fixedly supports, at a radially intermediate portion of the flange portion thereof, the support plate 60. Further, the hub member 61 supports the pressure plate 58 at a radially outward portion further than the portion at which the support plate 60 is supported so that the pressure plate 58 is arranged to be axially movable and to be unrotatable relative to the hub member 61. Still further, the hub member 61 rotatably contacts the other frictional member 57 (the first side frictional member 57 which is provided at adjacent to the output shaft 1) at a radially outward portion further than the portion at which the pressure plate 58 is supported.

The bearing member 62 is employed for rotatably supporting the plate member 51 at the outer circumference of the hub portion of the hub member 61. A bush or any possible bearing mechanism may be employed for the bearing member 44. A positional relationship between the hub member 61 and the plate member 51 is determined by the bearing member 62.

The bearing member 63 is employed for rotatably supporting the plate member 56 at the outer circumferential portion of the cylindrical portion of the plate member 51. A bush or any possible bearing mechanism may be employed for the bearing member 63. A positional relationship between the plate members 51 and 56 is determined by the bearing member 63.

The thrust member 64 is a frictional member provided between the plate member 53 and the cone disc spring 65 at a radially inner side position further than a position of each coil spring 54. The thrust member 64 rotatably contacts the plate member 53.

The cone disc spring 65 is a spring member provided between the thrust member 64 and the plate member 55 at a radially inner side position further than the position of each coil spring 54. The cone disc spring 65 biases the thrust member 64 towards the plate member 53.

The thrust member 66 is a frictional member provided between the plate members 53 and 56 at a radially inner side position further than the position of each coil spring 54. The thrust member 66 rotatably contacts the plate members 53 and 56.

According to the third embodiment, the same effect is obtained as the first embodiment.

Fourth Embodiment

Figure 4:
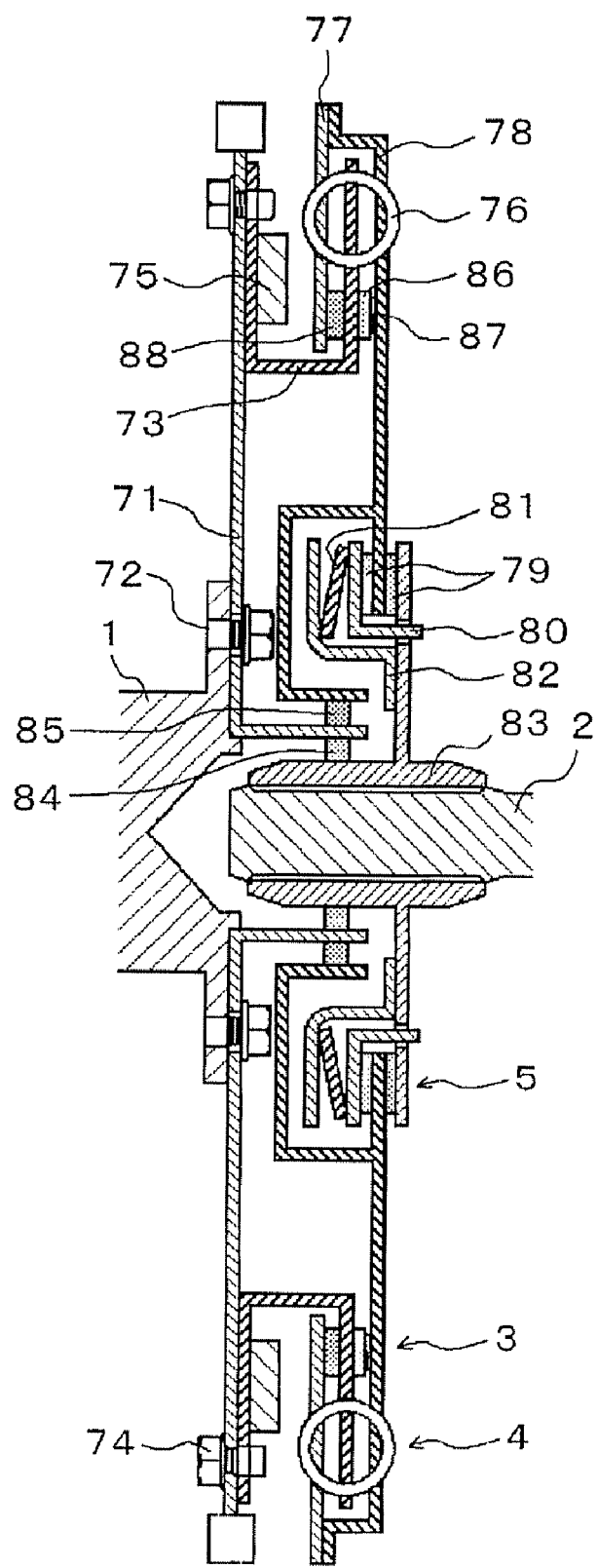
FIG. 4 is a cross sectional view schematically illustrating a torque fluctuation absorbing apparatus according to a fourth embodiment.

A fourth embodiment of the present invention will be described hereinbelow with reference to FIG. 4.

According to the fourth embodiment, the torque fluctuation absorbing apparatus includes a plate member 71, bolts 72, a plate member 73, bolts 74, an inertial member 75, a coil spring 76, a plate member 77, a plate member 78, frictional members 79, a pressure plate 80, a cone disc spring 81, a support plate 82, a hub member 83, bearing members 84, 85, thrust members 86, 88 and a cone disc spring 87.

The plate member (serving as a first member) 71 includes a cylindrical portion and a flange portion formed at one end (according to the fourth embodiment, a first side end) of the cylindrical portion. The plate member 71 rotates integrally with the output shaft 1. The plate member 71 is rotatably supported, at a radially inward portion of the cylindrical portion thereof, by the hub member 83 via the bearing member 84. Further, the plate member 71 rotatably supports, at an outer circumferential portion of the cylindrical portion thereof, the plate member 78 via the bearing member 85. The plate member 71 is assembled, at a radially inward portion of the flange portion, onto the end portion of the output shaft 1 by means of bolts 72. Further, the plate member 71 is fixedly connected, at a radially outward portion of the flange portion, to the plate member 73 so as to be integral therewith by means of the bolts 74.

Each of the bolts 72 serves as a connecting member for connecting the plate member 71 to the output shaft 1. The bolts 72 are respectively screwed onto the threaded holes formed at the end portion of the output shaft 1 before fixing the plate member 73 to the plate member 71 by means of the bolts 74.

The plate member (serving as the second member and also as the first plate member) 73 includes a cylindrical portion and flange portions (first and second side flange portions) respectively formed at both axial ends of the cylindrical portion. The plate member 73 serves as a component of the hysteresis portion 3 and the damper portion 4. The first side flange portion (i.e., one flange portion provided at adjacent to the output shaft 1 of the engine) of the plate member 73 is fixedly connected to the plate member 71 by means of the bolts 74. The inertial member 35 is fixedly connected to the plate member 33 at a radially inward portion further than the portion at which the bolts 74 are provided. The second side flange portion (i.e., another flange portion provided at adjacent to the input shaft 2 of the transmission) of the plate member 73 extends radially outwardly from the cylindrical portion so as to be interposed between the plate members 77 and 78. The second side flange portion of the plate member 73 is sandwiched between the thrust members 86 and 88 and supported thereby so as to be frictionally rotatable relative to the thrust members 86 and 88. The plate member 73 includes, at a radially outward portion of the second side flange portion thereof, plural opening portions for respectively accommodating the coil springs 76. Each coil spring 76 directly or indirectly contacts both end surfaces (end surfaces in a circumferential direction) of the corresponding opening portion of the plate member 73 so as to be separable therefrom.

Each of the bolts 74 serves as a connecting member for integrally connecting the plate member 73 to the plate member 71. The bolts 74 are screwed onto threaded holes formed at the plate member 73, respectively, through the plate member 71 from a first side surface thereof (i.e., from the left side in FIG. 4).

The inertial member 75 is provided at the first side flange portion of the plate member 73. A weight is employed for the inertial member 75, for example.

Each of the coil springs 76 serves as a component of the damper portion 4. The coil springs 76 are respectively accommodated in the opening portions of the plate member 73, opening portions formed at the plate member 77 and opening portions formed at the plate member 78. End portions (i.e., end portions in the circumferential direction) of each coil springs 76 directly or indirectly contact the end surfaces (the end surfaces in the circumferential direction) of the corresponding opening portion of the plate member 73 and end surfaces (end surfaces in the circumferential direction) of the corresponding opening portions of the plate members 77 and 78 so as to be separable therefrom. When the plate member 73 and the plate member 77 (the plate member 78) rotate relative to each other, each coil spring 76 is compressed and accordingly absorbs a torque fluctuation generated by a difference between a rotation of the plate member 73 and a rotation of the plate member 77 (a rotation of the plate member 78 which rotate integrally with the plate member 77). An inertia of the output-side members of the damper portion 4, which are provided at a torque transmitting path formed between the coil springs 76 and the input shaft 2 of the transmission, is set to be equal to or greater than 25% of the inertia of the entire torque fluctuation absorbing apparatus. Herein, the output-side members of the damper portion 4 include the plate members 77 and 78, the frictional members 79, the pressure plate 80, the cone disc spring 81, the support plate 82 and the hub member 83. So configured, a noise absorbing performance and a vibration absorbing performance of the torque fluctuation absorbing apparatus are improved.

The plate member (serving as the second plate member and also as the first/second plate portion of the second plate member) 77 is an annular member provided at a first side of the second side flange portion of the plate member 73 so as to face the inertial member 75 provided at the first side flange portion of the plate member 73. The plate member 77 serves as a component of the hysteresis portion 3 and the damper portion 4. The plate member 77 is fixedly connected, at the radially outward portion thereof, to the plate member 78. According to the fourth embodiment, being different from the second embodiment, cutout portions (such as the cutout portions 37a illustrated in FIG. 2) for passing therethrough bolts (such as the bolts 34 illustrated in FIG. 2) are not formed. Accordingly, the damper portion 4 is provided at a most radially outward position. The plate member 77 includes, at a radially intermediate portion thereof, the plural opening portions for respectively accommodating the coil springs 76. As described above, each coil spring 76 directly or indirectly contacts the end surfaces (the end surfaces in the circumferential direction) of the corresponding opening portion of the plate member 77 so as to be separable therefrom. The plate member 77 rotatably contacts, at a radially inward portion thereof, the thrust member 78.

The plate member (serving as the second plate member) 78 includes a cylindrical portion and a flange portion (serving as the second/first plate portion of the second plate member) formed in a predetermined shape. The flange portion of the plate member 78 extends from an end portion (according to the fourth embodiment, a first side end portion) of the cylindrical portion of the plate member 78. The plate member 78 serves as a component of the hysteresis portion 3, the damper portion 4 and the limiter portion 5. An inner circumferential portion of the cylindrical portion of the plate member 78 is supported by the cylindrical portion of the plate member 71 via the bearing member 85 so that the plate member 78 is rotatable relative to the plate member 71. The plate member 78 includes an extending portion which extends radially inwardly from a predetermined position of the flange portion. The frictional members 79 are fixedly provided at both surfaces of the extending portion of the plate member 78 by means of rivets, for example. The plate member 78 is connected, at a radially outward portion of the flange portion thereof, to the plate member 77. According to the fourth embodiment, being different from the second embodiment, cutout portions (such as the cutout portions 38a illustrated in FIG. 2) for passing therethrough bolts (such as the bolts 34 illustrated in FIG. 2) are not formed. Accordingly, as described above, the damper portion 4 is provided at the most radially outward position. The plate member 78 includes, at the flange portion thereof, the plural opening portions for respectively accommodating the coil springs 76. As described above, each coil spring 76 directly or indirectly contacts the end surfaces (the end surfaces in the circumferential direction) of the corresponding opening portion of the plate member 78 so as to be separable therefrom. The plate member 78 supports one end portion of the cone disc spring 87 at the flange portion.

The frictional members 79 (first and second frictional members) are annular members fixedly connected to the both surfaces of the flange portion of the plate member 78 at the extending portion thereof, respectively, by means of rivets, for example. Each frictional member 79 serves as a component of the limiter portion 5. The frictional members 79 relatively rotatably contact, at frictional surfaces thereof, the pressure plate 80 and the flange portion of the hub member 83.

The pressure plate 80 is an annular member provided between the cone disc spring 81 and one of the frictional members 79 (according to the fourth embodiment, the first side frictional member 79 which is provided at adjacent to the output shaft 1 of the engine). The pressure plate 80 serves as a component of the limiter portion 5. The pressure plate 80 is biased towards the frictional members 79 by the cone disc spring 81. The pressure plate 80 is arranged to be axially movable and to be unrotatable relative to the flange portion of the hub member 83. Further, the pressure plate 80 relatively rotatably contacts the first side frictional member 79.

The cone disc spring 81 is provided between the support plate 82 and the pressure plate 80. The cone disc spring 81 biases the pressure plate 80 towards the frictional members 79.

The support plate 82 is an annular plate member formed in a predetermined shape. The support plate 82 serves as a component of the limiter portion 5. The support plate 82 is fixedly connected, at a radially inward portion thereof, to the flange portion of the hub member 83. The support plate 82 contacts one end (according to the fourth embodiment, a radially inward end) of the cone disc spring 81.

The hub member 83 includes a cylindrical hub portion and the flange portion formed at an outer circumference of the cylindrical hub portion. The hub member 83 serves as a component of the limiter portion 5. An inner circumferential portion of the hub portion of the hub member 83 spline-engages the input shaft 2 so that the hub member 83 is arranged to be unrotatable relative to the input shaft 2. An outer circumferential portion of the hub portion of the hub member 83 rotatably supports the plate member 71 via the bearing member 84. Further, the hub member 83 fixedly supports, at a radially inward portion of the flange portion thereof, the support plate 82. Still further, the hub member 83 supports the pressure plate 80 at a radially outward portion further than the portion at which the support plate 82 is supported so that the pressure plate 80 is arranged to be axially movable and to be unrotatable relative to the hub member 83. Still further, the hub member 83 rotatably contacts the other frictional member 79 (the second side frictional member 79 which is provided at adjacent to the input shaft 2 of the transmission) at a radially outward portion further than the portion at which the pressure plate 80 is supported.

The bearing member 84 is employed for rotatably supporting the plate member 81 at the outer circumference of the hub portion of the hub member 83. A bush or any possible bearing mechanism may be employed for the bearing member 84. A positional relationship between the hub member 83 and the plate member 81 is determined by the bearing member 84.

The bearing member 85 is employed for rotatably supporting the plate member 78 at the outer circumferential portion of the cylindrical portion of the plate member 71. A bush or any possible bearing mechanism may be employed for the bearing member 85. A positional relationship between the plate members 71 and 78 is determined by the bearing member 85.

The thrust member 86 is a frictional member provided between the plate member 73 and the cone disc spring 87 at a radially inner side position further than a position of each coil spring 76. The thrust member 86 rotatably contacts the plate member 73.

The cone disc spring 87 is a spring member provided between the thrust member 86 and the plate member 78 at a radially inner side position further than the position of each coil spring 76. The cone disc spring 87 biases the thrust member 86 towards the plate member 73.

The thrust member 88 is a frictional member provided between the plate members 73 and 77 at a radially inner side position further than the position of each coil spring 76. The thrust member 88 rotatably contacts the plate members 73 and 77.

According to the fourth embodiment, the same effect is obtained as the first embodiment. Further, because the damper portion 4 is provided at the most radially outward position, a torsional angle is increased. Accordingly, a torsion performance and a damping performance of the torque fluctuation absorbing apparatus are accordingly improved.

Fifth Embodiment

Figure 5:
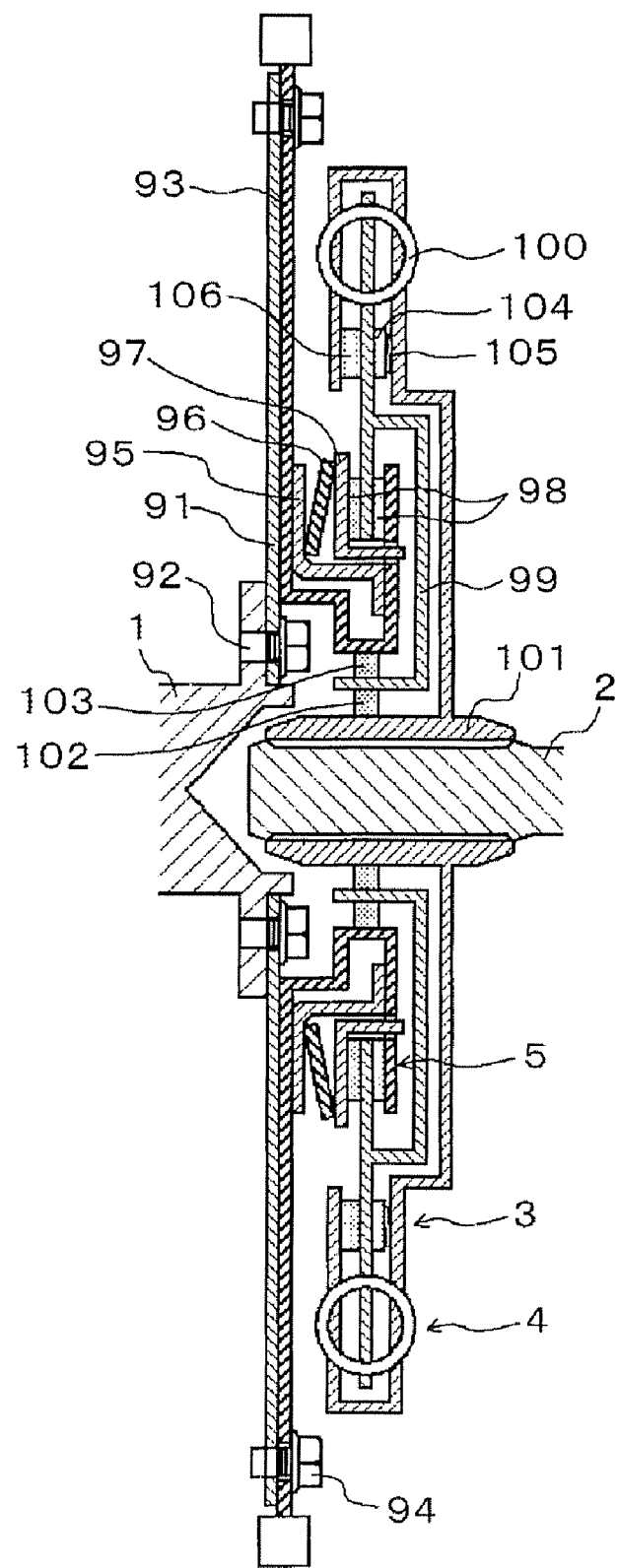
FIG. 5 is a cross sectional view schematically illustrating a torque fluctuation absorbing apparatus according to a fifth embodiment.

A fifth embodiment of the present invention will be described hereinbelow with reference to FIG. 5.

According to the fifth embodiment, the torque fluctuation absorbing apparatus includes a plate member 91, bolts 92, a plate member 93, bolts 94, a support plate 95, a cone disc spring 96, a pressure plate 97, frictional members 98, a plate member 99, coil springs 100, a hub member 101, bearing members 102, 103, thrust members 104, 106 and a cone disc spring 105.

The plate member (serving as the first member) 91 is a disc-shaped member which rotates integrally with the output shaft 1. The plate member 91 is assembled, at a radially inward portion thereof, onto the end portion of the output shaft 1 by means of the bolts 92. Further, the plate member 91 is fixedly connected to the plate member 93 so as to be integral therewith by means of the bolts 94 screwed at a radially outward portion of the plate member 91.

Each of the bolts 92 serves as a connecting member for connecting the plate member 91 to the output shaft 1. The bolts 92 are respectively screwed onto the threaded holes formed at the end portion of the output shaft 1 before fixedly connecting the plate member 93 to the plate member 91 by means of the bolts 94.

The plate member (serving as the second member) 93 includes a cylindrical portion and flange portions (first and second side flange portions) respectively formed at both axial ends of the cylindrical portion. The plate member 93 serves as a component of the limiter portion 5. The first side flange portion (i.e., one flange portion provided at adjacent to the output shaft 1 of the engine) of the plate member 93 is fixedly connected to the plate member 91 so as to be integral therewith by means of the bolts 94. The plate member 93 is supported, at an inner circumferential portion of the cylindrical portion thereof, by the plate member 99 so as to be rotatable relative thereto via the bearing member 103. Further, the plate member 93 rotatably contacts, at the second side flange portion thereof (i.e., another flange portion provided at adjacent to the input shaft 2 of the transmission), one of the frictional members 98 (according to the fifth embodiment, a second side frictional member 98). Further, the plate member 93 is arranged to be axially movable and to be unrotatable relative to the pressure plate 97 at a radially inward portion further than the portion at which the plate member 93 rotatably contacts the second side frictional member. Still further, the plate member 93 fixedly supports the support plate 95 at a radially inward portion further than the portion at which the pressure plate 97 is provided.

Each of the bolts 94 serves as a connecting member for integrally connecting the plate member 93 to the plate member 91. The bolts 94 are screwed onto threaded holes formed at the plate member 91, respectively, the plate member 93 from a second side surface thereof (i.e., from the right side in FIG. 5).

The support plate 95 is an annular plate member formed in a predetermined shape. The support plate 95 serves as a component of the limiter portion 5. The support plate 95 is fixedly connected, at a radially inward portion of the plate member 93, to the second side flange portion of the plate member 93. Further, the support plate 95 contacts one end (according to the fifth embodiment, a radially inward end) of the cone disc spring 96.

The cone disc spring 96 is provided between the support plate 95 and the pressure plate 97. The cone disc spring 96 biases the pressure plate 97 towards the frictional members 98.

The pressure plate 97 is an annular member provided between the cone disc spring 96 and another frictional member 98 (a first side frictional member 98). The pressure plate 97 serves as a component of the limiter portion 5. The pressure plate 97 is biased towards the frictional members 98 by the cone disc spring 96. The pressure plate 97 is arranged to be axially movable and to be unrotatable relative to the second side flange portion of the plate member 93. Further, the pressure plate 97 relatively rotatably contacts the first side frictional member 98.

The frictional members 98 (the first and second frictional members 98) are annular members fixedly respectively connected to the both surfaces of a flange portion of the plate member 99 at an extending portion thereof by means of rivets, for example. Each frictional member 98 serves as a component of the limiter portion 5. The frictional members 98 relatively rotatably contact, at frictional surfaces thereof, the pressure plate 97 and the second side flange portion of the plate member 93.

The plate member (serving as the first plate member) 99 includes a cylindrical portion and the flange portion formed in a predetermined shape. The flange portion of the plate member 99 extends from an end portion (according to the second embodiment, a second side end) of the cylindrical portion of the plate member 99. The plate member 99 serves as a component of the hysteresis portion 3, the damper portion 4 and the limiter portion 5. An inner circumferential portion of the cylindrical portion of the plate member 99 is supported by a cylindrical portion of the hub member 101 via the bearing member 102 so that the plate member 99 is rotatable relative to the hub member 101. Further, an outer circumferential portion of the cylindrical portion of the plate member 99 supports the cylindrical portion of the plate member 93 via the bearing member 103 so that the plate member 93 is rotatable relative to the plate member 99. The plate member 99 includes the extending portion which extends radially inwardly from a predetermined position of the flange portion. The frictional members 98 are provided at both surfaces of the extending portion of the plate member 98 by means of rivets, for example. The plate member 99 includes, at the flange portion thereof, plural opening portions for respectively accommodating the coil springs 100. Each soil spring 100 directly or indirectly contacts both end surfaces (end surfaces in the circumferential direction) of the corresponding opening portion of the plate member 99 so as to be separable therefrom. The flange portion of the plate member 99 is sandwiched between the thrust members 104 and 106 and is supported thereby so as to be frictionally rotatable relative to the thrust members 104 and 106.

Each of the coil springs 100 serves as a component of the damper portion 4. The coil springs 100 are respectively accommodated in the opening portions of the plate member 99 and opening portions formed at the hub member 101. End portions (i.e., end portions in the circumferential direction) of each coil springs 100 directly or indirectly contact the end surfaces (the end surfaces in the circumferential direction) of the corresponding opening portion of the plate member 99 and end surfaces (end surfaces in the circumferential direction) of the corresponding opening portions of the hub member 101 so as to be separable therefrom. When the plate member 99 and the hub member 101 rotate relative to each other, each coil spring 100 is compressed and accordingly absorbs a torque fluctuation generated by a difference between a rotation of the plate member 99 and a rotation of the hub member 101. An inertia of the output-side members of the damper portion 4, which are provided at a torque transmitting path formed between the coil springs 100 and the input shaft 2 of the transmission, is set to be equal to or greater than 25% of the inertia of the entire torque fluctuation absorbing apparatus. Herein, the output-side members of the damper portion 4 include the hub member 101. So configured, a noise absorbing performance and a vibration absorbing performance of the torque fluctuation absorbing apparatus are improved.

The hub member 101 includes a cylindrical hub portion and a flange portion (serving as the second plate member) formed at an outer circumference of the cylindrical hub portion. The hub member 101 serves as a component of the hysteresis portion 3 and the damper portion 4. An inner circumferential portion of the hub portion of the hub member 101 spline-engages the input shaft 2 so that the hub member 101 is arranged to be unrotatable relative to the input shaft 2 of the transmission. An outer circumferential portion of the hub portion of the hub member 101 rotatably supports the plate member 99 via the bearing member 102. Further, a disc-shaped portion (serving as the first/second plate portion of the second plate) extends radially inwardly from a radially outward portion of the flange portion (serving as a second/first plate portion of the second plate) of the hub member 101, so that the radially outward portion of the plate member 99 is interposed between the disc-shaped portion and the radially outward portion of the flange portion of the hub member 101. The hub member 101 includes, at the flange portion thereof, the plural opening portions for respectively accommodating the coil springs 100. As described above, each soil spring 100 directly or indirectly contacts the both end surfaces (the end surfaces in the circumferential direction) of the corresponding opening portion of the plate member 99 so as to be separable therefrom. The thrust members 104, 106 and the cone disc spring 105 are provided between the flange portion of the hub member 101 and the flange portion of the plate member 99. The flange portion of the hub member 101 rotatably contacts the thrust member 106. Further, the flange portion of the hub member 101 supports one end of the cone disc spring 105.

The bearing member 102 is employed for rotatably supporting the plate member 99 at the outer circumference of the hub portion of the hub member 101. A bush or any possible bearing mechanism may be employed for the bearing member 102. Thus, a positional relationship between the plate member 99 and the hub member 101 is determined by the bearing member 102.

The bearing member 103 is employed for rotatably supporting the plate member 93 at the outer circumferential portion of the cylindrical portion of the plate member 99. A bush or any possible bearing mechanism may be employed for the bearing member 103. Thus, a positional relationship between the plate member 99 and the plate member 93 is determined by the bearing member 103.

The thrust member 104 is a frictional member provided between the plate member 99 and the cone disc spring 105 at a radially inner side position further than a position of each coil spring 100. The thrust member 104 rotatably contacts the plate member 99.

The cone disc spring 105 is a spring member provided between the thrust member 104 and the hub member 101 (i.e., between the thrust member 104 and a right side portion of the flange portion of the hub member 101) at a radially inner side position further than the position of each coil spring 100. The cone disc spring 105 biases the thrust member 104 towards the plate member 99.

The thrust member 106 is a frictional member provided between the hub member 101 and the plate member 99 (i.e., between a left side portion of the flange portion of the hub member 101 and the plate member 99) at a radially inner side position further than the position of each coil spring 100. The thrust member 106 rotatably contacts the plate member 99 and the hub member 101 (the left side portion of the flange portion of the hub member 101).

According to the fifth embodiment, the same effect is obtained as the first embodiment.

Sixth Embodiment

Figure 6:
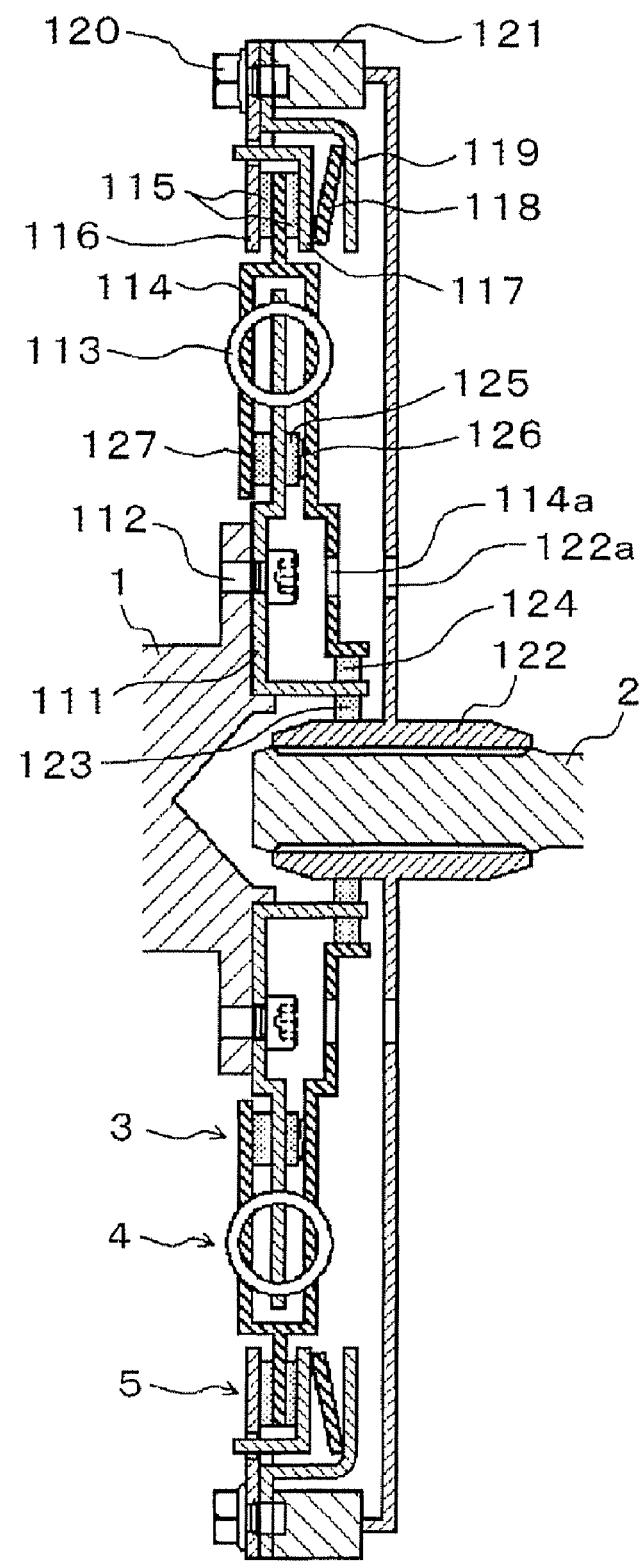
FIG. 6 is a cross sectional view schematically illustrating a torque fluctuation absorbing apparatus according to a sixth embodiment.

A sixth embodiment of the present invention will be described hereinbelow with reference to FIG. 6.

According to the sixth embodiment, the torque fluctuation absorbing apparatus includes a plate member 111, bolts 112, coil springs 113, a plate member 114, frictional members 115, a cover plate 116, a pressure plate 117, a cone disc spring 118, a support plate 119, bolts 120, a ring member 121, a hub member 122, bearing members 123, 124, thrust members 125, 127 and a cone disc spring 126.

The plate member (serving as the first plate member) 111 includes a cylindrical portion and a flange portion formed at one end (a first side end) of the cylindrical portion. The plate member 111 serves as a component of the hysteresis portion 3 and the damper portion 4. The plate member 111 rotates integrally with the output shaft 1. The plate member 111 is rotatably supported, at an inner circumferential portion of the cylindrical portion thereof, by the hub member 122 via the bearing member 123. Further, the plate member 111 rotatably supports, at an outer circumferential portion of the cylindrical portion thereof, the plate member 114 via the bearing member 124. The plate member 111 is assembled, at a radially inward portion of the flange portion, onto the end portion of the output shaft 1 by means of bolts 112. Further, a radially outward portion of the flange portion of the plate member 111 extends to be interposed between a disc-shaped portion and a flange portion of the plate member 114. The plate member 111 is sandwiched between the thrust members 127 and 125 and is frictionally rotatably supported thereby at a radially inward position further than a position at which the coil springs 113 are provided. Further, the plate member 111 includes, at a radially outward portion of the flange portion thereof, plural opening portions for respectively accommodating the coil springs 113. End portions of each coil spring 113 directly or indirectly contacts end surfaces (end surfaces in a circumferential direction) of the corresponding opening portion of the plate member 111 so as to be separable therefrom.

Each of the bolts 112 serves as a connecting member for fixedly connecting the plate member 111 to the output shaft 1. Each of the bolts 112 includes a hexagonal hole, for example. The bolts 112 are temporarily assembled onto the plate member 111 by inserting the bolts 112 into holes formed at the plate member 111 when assembling the torque fluctuation absorbing apparatus. Then, when the assembling of the torque fluctuation absorbing apparatus is almost completed, the bolts 112 are respectively screwed onto the threaded holes formed at the plate member 73 by means of a fixing tool (such as a hexagonal wrench, for example), which is allowed to pass through plural holes 122a formed at the hub member 122 and plural holes 114a formed at the plate member 114 from the second side of the torque fluctuation absorbing apparatus. Thus, the bolts 112 are fixed.

Each of the coil springs 113 serves as a component of the damper portion 4. The coil springs 113 are respectively accommodated in the opening portions of the plate member 111 and opening portions formed at the plate member 114. The end portions (i.e., the end portions in the circumferential direction) of each coil spring 115 directly or indirectly contact the end surfaces (the end surfaces in the circumferential direction) of the corresponding opening portion of the plate member 111 and end surfaces (the end surfaces in the circumferential direction) of the corresponding opening portion of the plate member 114 so as to be separable therefrom. When the plate member 111 and the plate member 114 rotate relative to each other, each coil spring 113 is compressed and accordingly absorbs a torque fluctuation generated by a difference between a rotation of the plate member 111 and a rotation of the plate member 114. An inertia of the output-side members of the damper portion 4, which are provided at the torque transmitting path formed between the coil springs 113 and the input shaft 2 of the transmission, is set to be equal to or greater than 25% of the inertia of the entire torque fluctuation absorbing apparatus. Herein, the output-side members of the damper portion 4 include the plate member 114, the frictional members 115, the cover plate 116, the pressure plate 117, the cone disc spring 118, the support plate 119, the bolts 120, the ring member 121 and the hub member 122. So configured, a noise absorbing performance and a vibration absorbing performance of the torque fluctuation absorbing apparatus are improved.

The plate member (serving as the second plate member) 114 includes the disc-shaped portion (serving as the first/second plate portion of the second plate member) and a cylindrical portion formed at an inner circumferential end portion of the disc-shaped portion. Further, the flange portion (serving as the second/first plate portion of the second plate member) extends from a predetermined position of the disc-shaped portion of the plate member 114. The disc-shaped portion (a radially intermediate portion of the disc-shaped portion) and the flange portion of the plate member 114 interpose therebetween the radially outward portion of the plate member 111. The plate member 114 serves as a component of the hysteresis portion 3, the damper portion 4 and the limiter portion 5. An inner circumferential portion of the cylindrical portion of the plate member 114 is supported by the cylindrical portion of the plate member 111 via the bearing member 124 so that the plate member 114 is rotatable relative to the plate member 111. The plate member 114 includes the plural hole portions 114a for respectively passing therethrough the fixing tool such as the hexagonal wrench for fixing the bolts 112. The thrust member 127, the thrust member 125 and the cone disc spring 126 are provided between the flange portion and the disc-shaped portion of the plate member 114, between which the radially outward portion of the plate member 111 is interposed. More specifically, the thrust member 127 is provided between the plate member 111 and the flange portion of the plate member 114 (the flange portion provided at adjacent to the output shaft 1 of the engine), while the thrust member 125 and the cone disc spring 126 are provided between the plate member 111 and the disc-shaped portion of the plate member 114 (the disc-shaped portion provided at adjacent to the input shaft 2 of the transmission). The plate member 114 includes the plural openings, for respectively accommodating therein the coil springs 113, at a radially outward portion further than the portion at which the thrust members 127, 125 and the cone disc spring 126 are provided. The end portions of each coil spring 113 directly or indirectly contact end surfaces (end surfaces in the circumferential direction) of the corresponding opening portion of the plate member 114 so as to be separable therefrom. An outer circumferential portion of the plate member 114 extends radially outwardly so as to be interposed between the pressure plate 117 and the cover plate 116. The frictional members 115 are fixedly connected to both surfaces of the radially outward portion of the plate member 114 by means of rivets, for example.

The frictional members 115 (first and second side frictional members) are annular members fixedly connected to the both surfaces of the radially outward portion of the plate member 114 by means of rivets, for example. Each frictional member 115 serves as a component of the limiter portion 5. The frictional members 115 relatively rotatably contact, at frictional surfaces thereof, the pressure plate 117 and the cover plate 116.

The cover plate 116 is an annular member. The cover plate 116 serves as a component of the limiter portion 5. The cover plate 116 is assembled, at a radially outward portion thereof, onto the ring member 121 along with the support plate 119 by means of the bolts 120. The cover plate 116 is arranged to be axially movable and to be unrotatable relative to the plate member 117. The cover plate 116 rotatably contacts, at a radially inward portion thereof, one of the frictional members 115 (specifically, the first side frictional member 115).

The pressure plate 117 is an annular member provided between the cone disc spring 118 and the other frictional member 115 (specifically, the second side frictional member 115). The pressure plate 117 serves as a component of the limiter portion 5. The pressure plate 117 is biased towards the frictional members 115 by the cone disc spring 118. The pressure plate 117 is arranged to be axially movable and to be unrotatable relative to the cover plate 116. Further, the pressure plate 117 relatively rotatably contacts the second side frictional member 115.

The cone disc spring 118 is provided between the support plate 119 and the pressure plate 117. The cone disc spring 118 biases the pressure plate 117 towards the frictional members 115.

The support plate 119 is an annular plate member formed in a predetermined shape. The support plate 119 serves as a component of the limiter portion 5. The support plate 119 is assembled, at a radially outward portion thereof, onto the ring member 121 along with the cover plate 116 by means of the bolts 120. The support plate 119 contacts one end (according to the sixth embodiment, a radially outward end) of the cone disc spring 118.

Each of the bolts 120 is employed for assembling the cover plate 116 and the support plate 119 onto the ring member 121.

The ring member 121 is an annular member. As described above, the cover plate 116 and the support plate 119 are assembled onto the ring member 121 by means of the bolts 120. The ring member 121 is fixedly connected to an outer circumferential end portion of a flange portion of the hub member 122.

The hub member 122 includes a cylindrical hub portion and the flange portion formed at an outer circumference of the cylindrical hub portion. An inner circumferential portion of the hub portion of the hub member 122 spline-engages the input shaft 2 of the transmission so that the hub member 122 is arranged to be unrotatable relative to the input shaft 2. Further, the outer circumferential portion of the hub portion of the hub member 122 rotatably supports the plate member 111 via the bearing member 123. The hub member 122 further includes, at the flange portion thereof, the plural hole portions 122 for passing therethrough the fixing tool for fixing the bolts 112.

The bearing member 123 is employed for rotatably supporting the plate member 111 at the outer circumferential portion of the hub portion of the hub member 122. A bush or any possible bearing mechanism may be employed for the bearing member 123. A positional relationship between the hub member 122 and the plate member 111 is determined by the bearing member 123.

The bearing member 124 is employed for rotatably supporting the plate member 114 at the outer circumferential portion of the cylindrical portion of the plate member 111. A bush or any possible bearing mechanism may be employed for the bearing member 124. A positional relationship between the plate member 111 and the plate member 114 is determined by the bearing member 124.

The thrust member 125 is a frictional member provided between the plate member 111 and the cone disc spring 126 at a radially inner side position further than a position of each coil spring 113. The thrust member 125 rotatably contacts the plate member 111.

The cone disc spring 126 is a spring member provided between the thrust member 125 and the plate member 114 (the disc-shaped portion of the plate member 114) at a radially inner side position further than the position of each coil spring 113. The cone disc spring 126 biases the thrust member 125 towards the plate member 111.

The thrust member 127 is a frictional member provided between the plate member 111 and the plate member 114 (the flange portion of the plate member 114) at a radially inner side position further than the position of each coil spring 113. The thrust member 127 rotatably contacts the plate member 111 and the plate member 114.

According to the sixth embodiment, the same effect is obtained as the first embodiment. Further, because a diameter of each of the hole portions 122a of the plate member 114 and the hole portions 114a of the plate member 114 is set to be smaller and the bolts 112 are tightened by means of the fixing tool (such as the hexagonal wrench) through the hole portions 122a and 114a, a strength of the plate members 114 and 122 is satisfactory obtained.

Seventh Embodiment

Figure 7:
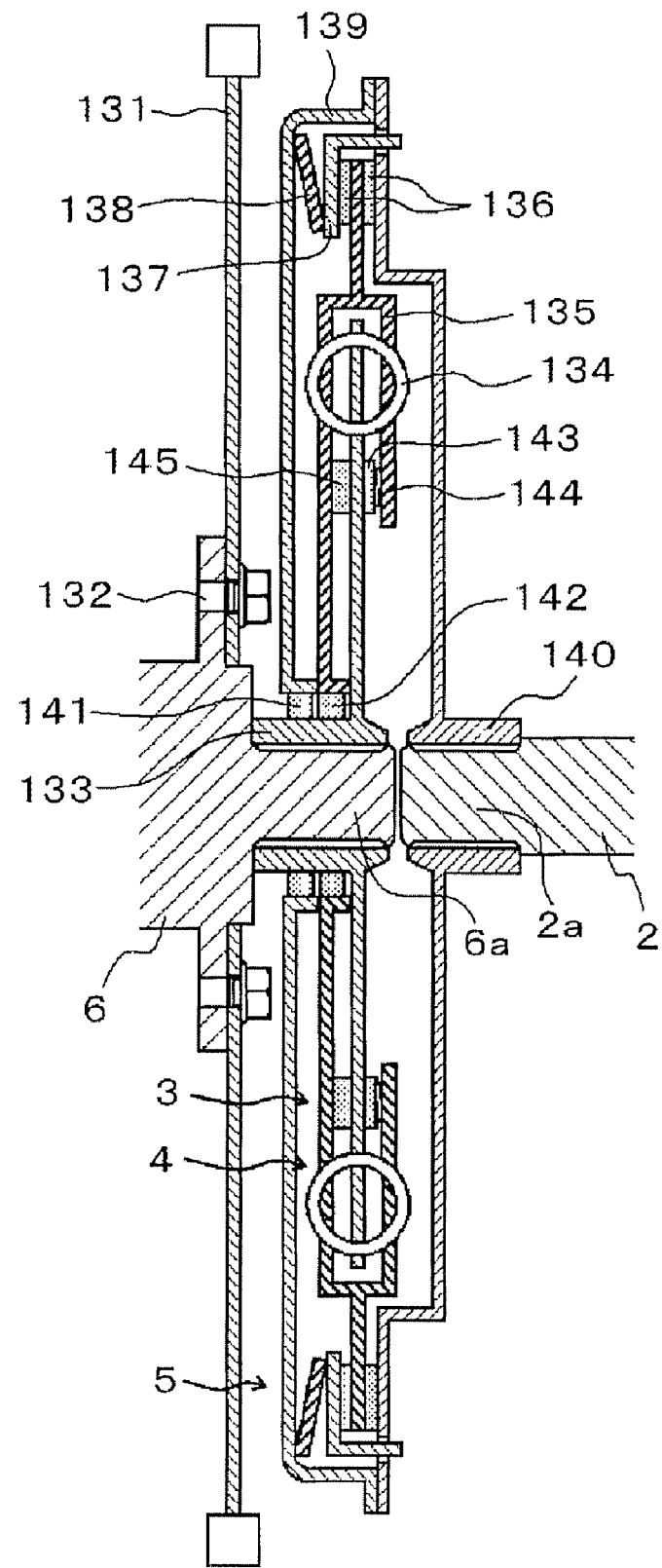
FIG. 7 is a cross sectional view schematically illustrating a torque fluctuation absorbing apparatus according to a seventh embodiment.

A seventh embodiment of the present invention will be described hereinbelow with reference to FIG. 7.

According to the seventh embodiment, the torque fluctuation absorbing apparatus includes a plate member 131, bolts 132, a hub member 133, coil springs 134, a plate member 135, frictional members 136, a pressure plate 137, a cone disc spring 138, a support plate 139, a hub member 140, bearing members 141, 142, thrust members 143, 145 and a cone disc spring 144.

The plate member 131 is a disc-shaped member. The plate member 131 is assembled, at a radially inward portion thereof, onto an output shaft 6 (serving as the first rotational shaft) of the power source by means of the bolts 132. A radially outward portion of the plate member 131 extends radially outwardly further than the limiter portion 5. Further, the plate member 131 serves as an inertial member.

Each of the bolts 132 serves as a connecting member for fixedly connecting the plate member 131 to the output shaft 6. The bolts 132 are screwed onto threaded holes formed at the output shaft 6, respectively.

The hub member (serving as the first plate member) 133 includes a cylindrical hub portion and a flange portion formed at one end (according to the seventh embodiment, a second side end) of the cylindrical hub portion. The hub member 133 serves as a component of the hysteresis portion 3 and the damper portion 4. The hub portion of the hub member 133 may spline-engage a stepped shaft portion (serving as a first stepped portion) 6a protruding from the output shaft 6 towards the input shaft 2 of the transmission, and the hub member 133 may be accordingly connected to the output shaft 6 so as to be unrotatable relative to the output shaft 6. Alternatively, the hub portion of the hub member 133 may include a recessed portion and a protruding portion which are to respectively engage with a protruding portion and a recessed portion formed at the stepped shaft portion 6a of the output shaft 6, and the hub member 133 may be accordingly connected to the output shaft 6 so as to be unrotatable relative to the output shaft 6. Thus, the hub member 133 rotates integrally with the output shaft 6. The hub member 133 rotatably supports, at a radially outward portion of the hub portion thereof, the support plate 139 via the bearing member 141. Further, the hub member 133 rotatably supports, at the outer circumferential portion of the hub portion thereof, the plate member 135 via the bearing member 142. The flange portion of the hub member 133 extends to be interposed between a disc-shaped portion and a flange portion of the plate member 135. Further, the flange portion of the hub member 133 is sandwiched between the thrust members 143 and 145 and is frictionally rotatably supported thereby at a radially outward portion further than a portion at which the coil springs 134 are provided. The hub member 133 includes, at a radially outward portion of the flange portion, plural opening portions for respectively accommodating the coil springs 134. End portions of each coil spring 134 directly or indirectly contact end surfaces (end surfaces in a circumferential direction) of the corresponding opening portion of the hub member 133 so as to be separable therefrom.

Each of the coil springs 134 serves as a component of the damper portion 4. The coil springs 134 are respectively accommodated in the opening portions of the hub member 133 and opening portions formed at the plate member 135. The end portions (i.e., the end portions in the circumferential direction) of each coil spring 134 directly or indirectly contact the end surfaces (the end surfaces in the circumferential direction) of the corresponding opening portion of the hub member 133 and end surfaces (the end surfaces in the circumferential direction) of the corresponding opening portion of the plate member 135 so as to be separable therefrom. When the hub member 133 and the plate member 135 rotate relative to each other, each coil spring 134 is compressed and accordingly absorbs a torque fluctuation generated by a difference between a rotation of the hub member 133 and a rotation of the plate member 135. An inertia of the output-side members of the damper portion 4, which are provided at the torque transmitting path formed between the coil springs 134 and the input shaft 2 of the transmission, is set to be equal to or greater than 25% of an inertia of the entire torque fluctuation absorbing apparatus. Herein, the output-side members of the damper portion 4 include the plate member 135, the frictional members 136, the pressure plate 137, the cone disc spring 138, the support plate 139 and the hub member 140. So configured, a noise absorbing performance and a vibration absorbing performance of the torque fluctuation absorbing apparatus are improved.

The plate member (serving as the second plate member) 135 includes the disc-shaped portion (serving as the first/second plate portion of the second plate member) and a cylindrical portion formed at an inner circumferential end portion of the disc-shaped portion. Further, the flange portion (serving as the second/first plate portion of the second plate member) extends from a predetermined position of the disc-shaped portion of the plate member 135. The disc-shaped portion (a radially intermediate portion of the disc-shaped portion) and the flange portion of the plate member 135 interpose therebetween the flange portion of the hub member 133. The plate member 135 serves as a component of the hysteresis portion 3, the damper portion 4 and the limiter portion 5. An inner circumferential portion of the cylindrical portion of the plate member 135 is supported by the cylindrical portion of the hub member 133 via the bearing member 142 so that the plate member 135 is rotatable relative to the hub member 133. The thrust member 143, the cone disc spring 144 and the thrust member 145 are provided between the flange portion and the disc-shaped portion of the plate member 135, between which the flange portion of the hub member 133 is interposed. More specifically, the thrust member 145 is provided between the flange portion of the hub member 133 and the disc-shaped portion of the plate member 135 (the disc-shaped portion provided at adjacent to the output shaft 6 of the engine), while the thrust member 143 and the cone disc spring 144 is provided between the flange portion of the hub member 133 and the flange portion of the plate member 135 (the flange portion provided at adjacent to the input shaft 2 of the transmission). The plate member 135 includes the plural openings, for respectively accommodating therein the coil springs 134, at a radially outward portion further than the portion at which the thrust members 144 and 145 are provided. The end portions of each coil spring 134 directly or indirectly contact the end surfaces (the end surfaces in the circumferential direction) of the corresponding opening portion of the plate member 135 so as to be separable therefrom. An outer circumferential portion of the plate member 135 extends radially outwardly so as to be interposed between the pressure plate 137 and a flange portion of the hub member 140. The frictional members 136 are fixedly connected to both surfaces of the radially outward portion of the plate member 135 by means of rivets, for example.

The frictional members 136 (first and second side frictional members) are annular members fixedly connected to the both surfaces of the radially outward portion of the plate member 135 by means of rivets, for example. Each frictional member 136 serves as a component of the limiter portion 5. The frictional members 136 relatively rotatably contact, at frictional surfaces thereof, the pressure plate 137 and the flange portion of the hub member 140.

The pressure plate 137 is an annular member provided between the cone disc spring 138 and one of the frictional members 136 (specifically, the first side frictional member 136). The pressure plate 137 serves as a component of the limiter portion 5. The pressure plate 137 is biased towards the frictional members 136 by the cone disc spring 138. The pressure plate 137 is arranged to be axially movable and to be unrotatable relative to the flange portion of the hub member 140. Further, the pressure plate 137 relatively rotatably contacts the first side frictional member 136.

The cone disc spring 138 is provided between the support plate 139 and the pressure plate 137. The cone disc spring 138 biases the pressure plate 137 towards the frictional members 136.

The support plate 139 is an annular plate member formed in a predetermined shape. The support plate 139 serves as a component of the limiter portion 5. The support plate 139 is fixedly connected, at a radially outward portion thereof, to the flange portion of the hub member 140. The support plate 139 contacts one end (according to the seventh embodiment, a radially outward end) of the cone disc spring 138. The support plate 139 includes a cylindrical portion at a radially inward portion. The support plate 139 is supported, at an inner circumferential portion of the cylindrical portion thereof, by the hub member 133 so as to be rotatable relative thereto via the bearing member 141.

The hub member 140 includes a cylindrical hub portion and the flange portion formed at an outer circumference of the cylindrical hub portion. An inner circumferential portion of the hub portion of the hub member 140 spline-engages a stepped shaft portion (serving as a second stepped shaft portion) 2a formed at the input shaft 2 of the transmission so that the hub member 140 is arranged to be unrotatable relative to the input shaft 2. The support plate 139 is fixedly connected to a radially outward portion of the flange portion of the hub member 140. Further, the pressure plate 137 is provided at the flange portion of the hub member 140 at a radially inward portion further than the portion to which the support plate 139 is connected so that the pressure plate 137 is arranged to be axially movable and to be unrotatable relative to the flange portion of the hub member 140. Still further, the hub member 140 rotatably contacts the frictional members 136 at a radially inward portion further than the portion at which the pressure plate 137 is provided.

The bearing member 141 is employed for rotatably supporting the support plate 139 at the outer circumferential portion of the hub portion of the hub member 133. A bush or any possible bearing mechanism may be employed for the bearing member 141. A positional relationship between the hub member 133 and the support plate 139 is determined by the bearing member 141.

The bearing member 142 is employed for rotatably supporting the plate member 135 at the outer circumferential portion of the hub portion of the hub member 133. A bush or any possible bearing mechanism may be employed for the bearing member 142. A positional relationship between the hub member 133 and the plate member 135 is determined by the bearing member 142.

The thrust member 143 is a frictional member provided between the flange portion of the hub member 133 and the cone disc spring 144 at a radially inner side position further than a position of each coil spring 134. The thrust member 143 rotatably contacts the flange portion of the hub member 133.

The cone disc spring 144 is a spring member provided between the thrust member 143 and the plate member 135 (the flange portion of the plate member 135) at a radially inner side position further than the position of each coil spring 134. The cone disc spring 144 biases the thrust member 143 towards the flange portion of the hub member 133.

The thrust member 145 is a frictional member provided between the flange portion of the hub member 133 and the plate member 135 (the disc-shaped portion of the plate member 135) at a radially inner side position further than the position of each coil spring 134. The thrust member 145 rotatably contacts the flange portion of the hub member 133 and the plate member 135.

According to the seventh embodiment, the same effect is obtained as the first embodiment.

Eighth Embodiment

An eighth embodiment of the present invention will be described hereinbelow with reference to FIG. 8.

According to the eighth embodiment, the torque fluctuation absorbing apparatus includes a plate member 151, bolts 152, a plate member 153, bolts 154, an inertial member 155, coil springs 156, a plate member 157, a plate member 158, frictional members 159, a pressure plate 160, a cone disc spring 161, a support plate 162, a hub member 163, bearing members 164, 165, thrust members 166, 168, a cone disc spring 167 and a guide plate 169.

The plate member (serving as the first member) 151 includes a cylindrical portion and a flange portion formed at one end (a first side end) of the cylindrical portion. The plate member 151 rotates integrally with the output shaft 1. The plate member 151 is rotatably supported, at an inner circumferential portion of the cylindrical portion thereof, by the hub member 163 via the bearing member 164. Further, the plate member 151 rotatably supports, at an outer circumferential portion of the cylindrical portion thereof, the plate member 158 via the bearing member 165. The plate member 151 is assembled, at a radially inward portion of the flange portion thereof, onto the end portion of the output shaft 1 by means of bolts 152. Further, the plate member 151 is fixedly connected, at a radially outward portion of the flange portion thereof, to the plate member 153 so as to be integral therewith by means of the bolts 154.

Each of the bolts 152 serves as a connecting member for connecting the plate member 151 to the output shaft 1. The bolts 152 are respectively screwed onto the threaded holes formed at the end portion of the output shaft 1 before fixing the plate member 153 to the plate member 151 by means of the bolts 154.

The plate member (serving as the second member and also as the first plate member) 153 includes a cylindrical portion and flange portions (first and second side flange portions) respectively formed at both axial ends of the cylindrical portion. The plate member 153 serves as a component of the hysteresis portion 3 and the damper portion 4. The first side flange portion (i.e., one flange portion provided at adjacent to the output shaft 1 of the engine) of the plate member 153 is integrally connected to the plate member 151 by means of the bolts 154. The inertial member 155 is fixedly connected to the plate member 153 at a radially inward portion further than a portion at which the bolts 154 are provided. The second side flange portion (i.e., another flange portion provided at adjacent to the input shaft 2 of the transmission) of the plate member 153 extends radially outwardly from the cylindrical portion so as to be interposed between the plate members 157 and 158. The second side flange portion of the plate member 153 is sandwiched between the thrust members 166 and 168 and frictionally rotatably supported thereby. The plate member 153 further includes, at a radially outward portion of the second side flange portion thereof, plural opening portions for respectively accommodating the coil springs 156. Each coil spring 156 directly or indirectly contacts both end surfaces (end surfaces in the circumferential direction) of the corresponding opening portion of the plate member 153 so as to be separable therefrom.

Each of the bolts 154 serves as a connecting member for integrally connecting the plate members 153 and 151. The bolts 154 are screwed onto threaded holes formed at the plate member 153, respectively, through the plate member 151 from a first side thereof (i.e., from the left side in FIG. 8).

The inertial member 155 is provided at the first side flange portion of the plate member 153. A weight is employed for the inertial member 155, for example.

Each of the coil springs 156 serves as a component of the damper portion 4. The coil springs 156 are respectively accommodated in the opening portions of the plate member 153, accommodating portions formed at the plate member 157 and accommodating portions formed at the plate member 158. Each coil spring 156 is formed in a curved shape in advance along a shape of the opening portions formed at the plate member 153 and that of the accommodating portions formed at the plate members 157 and 158. End portions (i.e., end portions in the circumferential direction) of each coil springs 156 directly or indirectly contact the end surfaces (the end surfaces in the circumferential direction) of the corresponding opening portion of the plate member 153 and end surfaces (end surfaces in the circumferential direction) of the corresponding accommodating portions of the plate member 157 and of the plate member 158 so as to be separable therefrom. When the plate member 153 and the plate member 157 (the plate member 158) rotate relative to each other, each coil spring 156 is compressed and accordingly absorbs a torque fluctuation generated by a difference between a rotation of the plate member 153 and a rotation of the plate member 157 (and a rotation of the plate member 158 which rotates integrally with the plate member 157). An inertia of the output-side members of the damper portion 4, which are provided at a torque transmitting path formed between the coil springs 156 and the input shaft 2 of the transmission, is set to be equal to or greater than 25% of the inertia of the entire torque fluctuation absorbing apparatus. Herein, the output-side members of the damper portion 4 include the plate members 157 and 158, the frictional members 159, the pressure plate 160, the cone disc spring 161, the support plate 162 and the hub member 163. So configured, a noise absorbing performance and a vibration absorbing performance of the torque fluctuation absorbing apparatus are improved.

The plate member (serving as the second plate member and also as the first/second plate portion of the second plate member) 157 is an annular member provided at a first side of the second side flange portion of the plate member 153 so as to face the inertial member 155 provided at the first side flange portion of the plate member 153. The plate member 157 serves as a component of the hysteresis portion 3 and the damper portion 4. The plate member 157 is fixedly connected, at the radially outward portion thereof, to the plate member 158. According to the eighth embodiment, being different from the second embodiment, cutout portions (such as the cutout portions 37*a* illustrated in FIG. 2) for passing therethrough bolts (such as the bolts 34 illustrated in FIG. 2) are not formed. Accordingly, the damper portion 4 is provided at the most radially outward position. The plate member 157 includes, at a radially intermediate portion thereof, the plural accommodating portions for respectively accommodating the coil springs 156. As described above, each coil spring 156 directly or indirectly contacts the end surfaces (the end surfaces in the circumferential direction) of the corresponding accommodating portion of the plate member 157 so as to be separable therefrom. The accommodating portions of the plate member 157 do not include any through holes for allowing an inner side portion of each accommodating portion to communicate with an outer side thereof. A lubricant, such as oil or grease is filled within each accommodating portion of the plate member 157. The plate member 157 and the plate member 158 are connected to each other by welding at a radially outward position further than the position at which the coil springs 156 are provided, so that the lubricant encapsulated within each accommodating portion of the plate member 157 and the corresponding accommodating portion of the plate member 158 does not flow therefrom to the external ambience. A sealing member may be provided between the plate members 157 and 158 for fixedly connecting the plate members 157 and 158 instead of connecting the plate members 157 and 158 by welding. The plate member 157 rotatably contacts, at a radially inward portion thereof, the thrust member 168.

The plate member (serving as the second plate ember) 158 includes a cylindrical portion and a flange portion (serving as the second/first plate portion of the second plate member) formed at one end (a first side end) of the cylindrical portion. The flange portion of the plate member 158 is formed in a predetermined shape. The plate member 158 serves as a component of the hysteresis portion 3, the damper portion 4 and the limiter portion 5. An inner circumferential portion of the cylindrical portion of the plate member 158 is supported by the cylindrical portion of the plate member 151 via the bearing member 165 so that the plate member 158 is rotatable relative to the plate member 151. The plate member 158 includes an extending portion which extends radially inwardly from a predetermined position of the flange portion. The frictional members 159 are fixedly provided at both surfaces of the extending portion of the plate member 158 by means of rivets, for example. The plate member 158 is connected, at a radially outward portion of the flange portion thereof, to the plate member 157. According to the eighth embodiment, being different from the second embodiment, cutout portions (such as the cutout portions 38*a* illustrated in FIG. 2) for passing therethrough bolts (such as the bolts 34 illustrated in FIG. 2) are not formed. Accordingly, as described above, the damper portion 4 is provided at the most radially outward position. The plate member 158 includes, at the flange portion thereof, the plural accommodating portions for respectively accommodating the coil springs 156. Each coil spring 156 directly or indirectly contacts the end surfaces (the end surfaces in the circumferential direction) of the corresponding accommodating portion of the plate member 158 so as to be separable therefrom. The accommodating portions of the plate member 158 do not include any through holes for allowing an inner side portion of each accommodating portion to communicate with an outer side thereof. The lubricant, such as oil or grease is filled within each accommodating portion of the plate member 158. The plate member 157 and the plate member 158 are connected to each other by welding at the radially outward position further than the position at which the coil springs 156 are provided, so that the lubricant encapsulated within each accommodating portion of the plate member 157 and the corresponding accommodating portion of the plate member 158 does not flow therefrom to the external ambience. A sealing member may be provided between the plate members 157 and 158 for fixedly connecting the plate members 157 and 158 instead of connecting the plate members 157 and 158 by welding. The plate member 158 supports one end portion of the cone disc spring 167 at the flange portion.

The frictional members 159 (first and second frictional members) are annular members respectively fixedly connected to the both surfaces of the flange portion of the plate member 158 at the extending portion thereof by means of rivets, for example. Each frictional member 159 serves as a component of the limiter portion 5. The frictional members 159 relatively rotatably contact, at frictional surfaces thereof, the pressure plate 160 and a flange portion of the hub member 163.

The pressure plate 160 is an annular member provided between the cone disc spring 161 and one of the frictional members 159 (more specifically, the first side frictional member 159). The pressure plate 160 serves as a component of the limiter portion 5. The pressure plate 160 is biased towards the frictional members 159 by the cone disc spring 161. The pressure plate 160 is arranged to be axially movable and to be unrotatable relative to the flange portion of the hub member 163. Further, the pressure plate 160 relatively rotatably contacts the first side frictional member 159.

The cone disc spring 161 is provided between the support plate 162 and the pressure plate 160. The cone disc spring 161 biases the pressure plate 160 towards the frictional members 159.

The support plate 162 is an annular plate member formed in a predetermined shape. The support plate 162 serves as a component of the limiter portion 5. The support plate 162 is fixedly connected, at a radially inward portion thereof, to the flange portion of the hub member 163. The support plate 162 contacts one end (according to the second embodiment, a radially inward end) of the cone disc spring 161.

The hub member 163 includes a cylindrical hub portion and the flange portion formed at an outer circumference of the cylindrical hub portion. The hub member 163 serves as a component of the limiter portion 5. An inner circumferential portion of the hub portion of the hub member 163 spline-engages the input shaft 2 so that the hub member 163 is arranged to be unrotatable relative to the input shaft 2. An outer circumferential portion of the hub portion of the hub member 163 rotatably supports the plate member 151 via the bearing member 164. Further, the hub member 163 fixedly supports, at a radially inward portion of the flange portion thereof, the support plate 162. Still further, the hub member 163 supports the pressure plate 160 at a radially outward portion further than the portion at which the support plate 162 is supported so that the pressure plate 160 is arranged to be axially movable and to be unrotatable relative to the hub member 163. Still further, the hub member 163 rotatably contacts the other frictional member 159 (the second side frictional member 159) at a radially outward portion further than the portion at which the pressure plate 160 is supported.

The bearing member 164 is employed for rotatably supporting the plate member 151 at the outer circumferential portion of the hub portion of the hub member 163. A bush or any possible bearing mechanism may be employed for the bearing member 164. A positional relationship between the hub member 163 and the plate member 151 is determined by the bearing member 164.

The bearing member 165 is employed for rotatably supporting the plate member 158 at the outer circumferential portion of the cylindrical portion of the plate member 151. A bush or any possible bearing mechanism may be employed for the bearing member 165. A positional relationship between the plate member 151 and the plate member 158 is determined by the bearing member 165.

The thrust member 166 is a frictional member provided between the plate member 153 and the cone disc spring 167 at a radially inner side position further than a position of each coil spring 156. The thrust member 166 rotatably contacts the plate member 153. Further, the thrust member 166 reduces the lubricant encapsulated within the accommodating portions of the plate members 157 and 158 from flowing therefrom to the external ambience.

The cone disc spring 167 is a spring member provided between the thrust member 166 and the plate member 158 at a radially inner side position further than the position of each coil spring 156. The cone disc spring 167 biases the thrust member 166 towards the plate member 153. Further, the cone disc spring 167 reduces the lubricant encapsulated within the accommodating portions of the plate members 157 and 158 from flowing therefrom to the external ambience.

The thrust member 168 is a frictional member provided between the plate members 153 and 157 at a radially inner side position further than the position of each coil spring 156. The thrust member 168 rotatably contacts the plate member 153 and the plate member 157. Further, the thrust member 168 reduces the lubricant encapsulated within the accommodating portions of the plate members 157 and 158 from flowing therefrom to the external ambience.

The guide plate 169 is provided between an outer circumferential surface of each coil spring 156 and the plate members 157 and 158. When each coil springs 156 is compressed, the guide plate 169 guides each coil spring 156 along a circumferential surface formed by the plate members 157 and 158. Thus, the guide plate 169 rotatably contacts the coil springs 156 and the plate members 157 and 158.

According to the eighth embodiment, the same effect is obtained as the first embodiment. Further, an abrasion resistance of each coil springs 156 is improved because of the lubricant. Further, portions around the coil springs 156 are structured in a fluid-tight manner, so that the lubricant is reduced from flowing to the external ambience. Still further, because the accommodating portions formed at the plate members 157 and 158 shield the coil springs 156 from the external ambience, extraneous objects such as dust and/or water are reduced from penetrating to the coil springs 156. Accordingly, a deterioration of functions of the torque fluctuation absorbing apparatus and/or a generation of rust is reduced.

Ninth Embodiment

Figure 9:
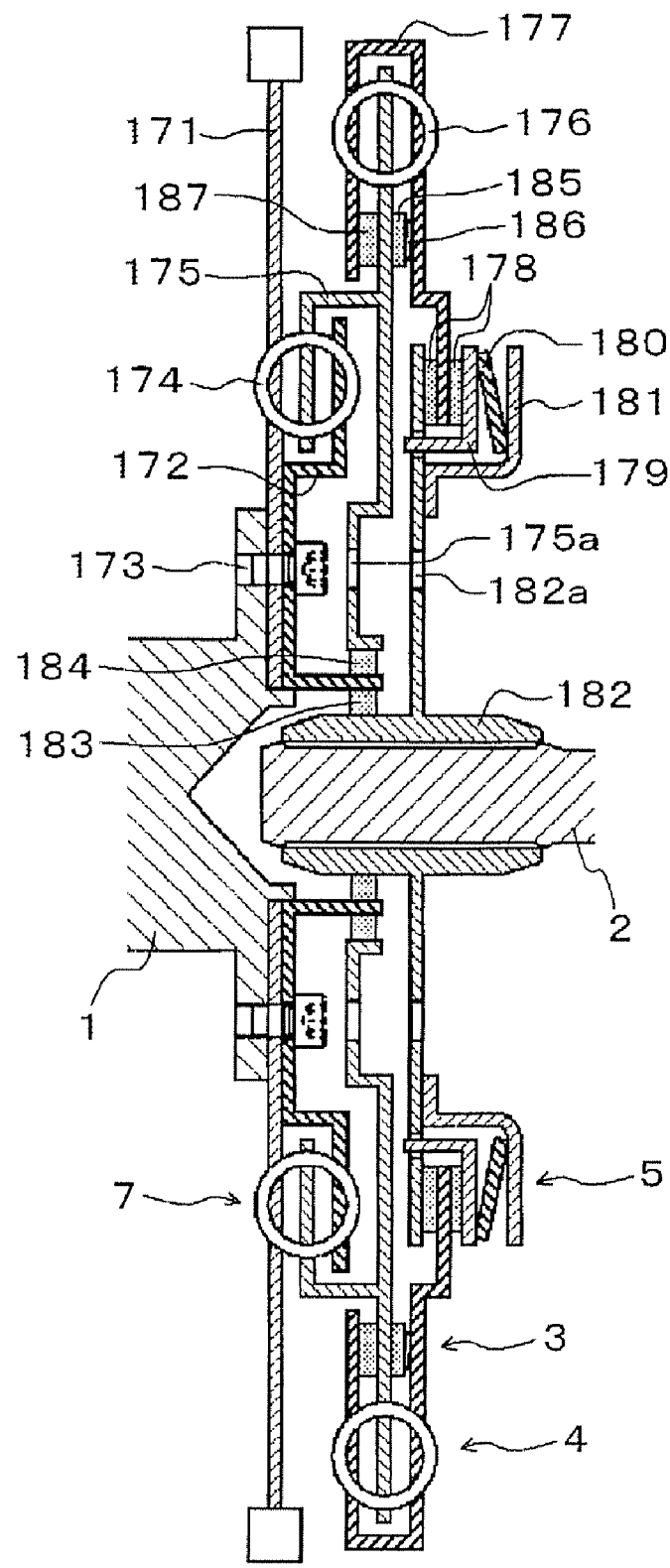
FIG. 9 is a cross sectional view schematically illustrating a torque fluctuation absorbing apparatus according to a ninth embodiment.

A ninth embodiment of the present invention will be described hereinbelow with reference to FIG. 9.

According to the ninth embodiment, the torque fluctuation absorbing apparatus includes a plate member 171, a plate member 172, bolts 173, coil springs 174, a plate member 175, coil springs 176, a plate member 177, frictional members 178, a pressure plate 179, a cone disc spring 180, a support plate 181, a hub member 182, bearing members 183, 184, thrust members 185, 187 and a cone disc spring 186.

The plate member (serving as the first member) 171 is a disc-shaped member. The plate member 171 serves as a component of a damper portion (serving as an auxiliary damper portion) 7. The plate member 171 is assembled, at a radially inward portion thereof, onto the output shaft 1 along with the plate member 172 by means of the bolts 173. The plate member 171 rotates integrally with the output shaft 1. Further, the plate member 171 includes, at a radially intermediate portion thereof, plural opening portions for respectively accommodating the coil springs 174. End portions of each coil spring 174 directly or indirectly contact end surfaces (end surfaces in the circumferential direction) of the corresponding opening portion of the plate member 171 so as to be separable therefrom.

The plate member (serving as the second member) 172 includes a cylindrical portion and a flange portion formed at one end (a first side end) of the cylindrical portion. The plate member 172 serves as a component of the damper portion 7. The plate member 172 rotates integrally with the output shaft 1. The plate member 172 is rotatably supported, at an inner circumferential portion of the cylindrical portion thereof, by the hub member 182 via the bearing member 183. Further, the plate member 172 rotatably supports, at an outer circumferential portion of the cylindrical portion thereof, the plate member 175 via the bearing member 184. The plate member 172 is assembled, at a radially inward portion of the flange portion thereof, onto the end portion of the output shaft 1 along with the plate member 171 by means of the bolts 173. Further, a radially outward portion of the flange portion of the plate member 172 extends to be interposed between a disc-shaped portion and a flange portion of the plate member 175. The plate member 172 includes, at a radially outward portion of the flange portion thereof, plural opening portions for respectively accommodating the coil springs 174. End portions of each coil spring 174 directly or indirectly contacts end surfaces (end surfaces in the circumferential direction) of the corresponding opening portion of the plate member 172 so as to be separable therefrom.

Each of the bolts 173 serves as a connecting member for fixedly connecting the plate members 171 and 172 to the output shaft 1. Each of the bolts 173 includes a hexagonal hole, for example. The bolts 173 are temporarily assembled onto the plate member 172 by inserting the bolts 173 into holes formed at the plate member 172 when assembling the torque fluctuation absorbing apparatus. Then, when the assembling of the torque fluctuation absorbing apparatus is almost completed, the bolts 173 are respectively screwed onto the threaded holes formed at the end portion of the output shaft 1 by means of a fixing tool (such as a hexagonal wrench, for example), which is allowed to pass through plural holes 182*a* formed at the hub member 182 and plural holes 175*a* formed at the plate member 175 from the second side of the torque fluctuation absorbing apparatus. Thus, the bolts 173 are fixed.

Each of the coil springs 174 serves as a component of the damper portion 7. The coil springs 174 are respectively accommodated in the opening portions of the plate member 171, the opening portions of the plate member 172 and opening portions formed at the plate member 175. The end portions (i.e., the end portions in the circumferential direction) of each coil spring 174 directly or indirectly contact the end surfaces (the end surfaces in the circumferential direction) of the corresponding opening portion of the plate members 171, 172 and of the plate member 175 so as to be separable therefrom. When the plate member 171 (the plate member 172) and the plate member 175 rotate relative to each other, each coil spring 174 is compressed and accordingly absorbs a torque fluctuation generated by a difference between a rotation of the plate member 171 (a rotation of the plate member 172 which rotates integrally with the plate member 171) and a rotation of the plate member 175.

The plate member (serving as the first plate member) 175 includes the disc-shaped portion and a cylindrical portion formed at an inner circumferential end portion of the disc-shaped portion. Further, the flange portion extends from a predetermined position of the disc-shaped portion of the plate member 175. The disc-shaped portion (a radially intermediate portion of the disc-shaped portion) and the flange portion of the plate member 175 interpose therebetween the radially outward portion of the plate member 172. The plate member 175 serves as a component of the hysteresis portion 3, the damper portion 4 and the damper portion 7. An inner circumferential portion of the cylindrical portion of the plate member 175 is supported by the cylindrical portion of the plate member 172 via the bearing member 184 so that the plate member 175 is rotatable relative to the plate member 172. The plate member 175 includes the plural hole portions 175*a* (serving as an opening portion for connecting the first and second members to the output shaft of the engine) for respectively passing therethrough the fixing tool such as the hexagonal wrench for fixing the bolts 173. The plate member 175 includes the plural openings, for respectively accommodating therein the coil springs 173, at the flange portion i.e., at a portion interposed between the plate members 171 and 172. The end portions of each coil spring 173 directly or indirectly contact the end surfaces (the end surfaces in the circumferential direction) of the corresponding opening portion of the plate member 175 so as to be separable therefrom. A radially outward portion of the disc-shaped portion of the plate member 175 is interposed between a flange portion and a disc-shaped portion of the plate member 177. The thrust member 187 is provided between the radially outward portion of the disc-shaped portion of the plate member 175 and the flange portion of the plate member 177 (the flange portion provided at adjacent to the output shaft 1 of the engine), while the thrust member 185 and the cone disc spring 186 are provided between the radially outward portion of the disc-shaped portion of the plate member 175 and the disc-shaped portion of the plate member 177 (the disc-shaped portion provided at adjacent to the input shaft 2 of the transmission). The plate member 175 further includes, at the radially outward portion thereof, plural opening portions for respectively accommodating the coil springs 176. End portions of each coil spring 176 directly or indirectly contact end surfaces (end surfaces in the circumferential direction) of the corresponding opening portion of the plate member 175 so as to be separable therefrom.

Each of the coil springs 176 serves as a component of the damper portion 4. The coil springs 176 are respectively accommodated in the opening portions of the plate member 175 and opening portions formed at the plate member 177. The end portions (i.e., the end portions in the circumferential direction) of each coil spring 176 directly or indirectly contact the end surfaces (the end surfaces in the circumferential direction) of the corresponding opening portion of the plate member 175 and end surfaces (the end surfaces in the circumferential direction) of the corresponding opening portion of the plate member 177 so as to be separable therefrom. When the plate member 175 and the plate member 177 rotate relative to each other, each coil spring 176 is compressed and accordingly absorbs a torque fluctuation generated by a difference between a rotation of the plate member 175 and a rotation of the plate member 177. An inertia of the output-side members of the damper portion 4, which are provided at the torque transmitting path formed between the coil springs 176 and the input shaft 2 of the transmission, is set to be equal to or greater than 25% of the inertia of the entire torque fluctuation absorbing apparatus. Herein, the output-side members of the damper portion 4 include the plate member 177, the frictional members 178, the pressure plate 179, the cone disc spring 180, the support plate 181 and the hub member 182. So configured, a noise absorbing performance and a vibration absorbing performance of the torque fluctuation absorbing apparatus are improved.

The plate member (serving as the second plate member) 177 includes the disc-shaped portion (serving as the first/second plate portion of the second plate member) and the flange portion (serving as the second/first plate portion of the second plate member) extending radially inwardly from a radially outward portion of the disc-shaped portion. A radially inward portion of the disc-shaped portion of the plate member 177 is interposed between a flange portion of the hub member 182 and the pressure plate 179. The disc-shaped portion (the radially outward portion of the disc-shaped portion) and the flange portion of the plate member 177 interpose therebetween the radially outward portion of the disc-shaped portion of the plate member 175. As described above, the thrust member 187 is provided between the radially outward portion of the disc-shaped portion of the plate member 175 and the flange portion of the plate member 177 (the flange portion provided at adjacent to the output shaft 1 of the engine), while the thrust member 185 and the cone disc spring 186 are provided between the radially outward portion of the disc-shaped portion of the plate member 175 and the disc-shaped portion of the plate member 177 (the disc-shaped portion provided at adjacent to the input shaft 2 of the transmission). The plate member 177 includes the plural opening portions at the flange portion and the disc-shaped portion thereof. Mores specifically, plural openings are formed at the flange portion of the plate member 177 at a radially outward position further than the position at which the thrust member 187 is provided, while plural openings are formed at the disc-shaped portion of the plate member 177 at a radially outward position further than the position at which the thrust member 185 and the cone disc spring 186 are provided so as to respectively correspond to the openings formed at the flange portion. Each opening formed at the flange portion of the plate member 177 and the corresponding opening formed at the disc-shaped portion of the plate member 177 structure each opening portion of the plate member 177 for accommodating therein each coil spring 176. The end portions of each coil spring 176 directly or indirectly contact end surfaces (end surfaces in the circumferential direction) of the corresponding opening portion of the plate member 177 so as to be separable therefrom. The frictional members 178 are fixedly connected to both surfaces of the radially inward portion of the plate member 177 (the radially inward portion which is interposed between the flange portion of the hub member 182 and the pressure plate 179) by means of rivets, for example.

The frictional members 178 (first and second side frictional members) are annular members fixedly connected to the both surfaces of the radially inward portion of the plate member 177 by means of rivets, for example. Each frictional member 178 serves as a component of the limiter portion 5. The frictional members 178 relatively rotatably contact, at frictional surfaces thereof, the pressure plate 179 and the flange portion of the hub member 182.

The pressure plate 179 is an annular member provided between the cone disc spring 180 and one of the frictional members 178 (specifically, the second side frictional member 178). The pressure plate 179 serves as a component of the limiter portion 5. The pressure plate 179 is biased towards the frictional members 178 by the cone disc spring 180. The pressure plate 179 is arranged to be axially movable and to be unrotatable relative to the flange portion of the hub member 182. Further, the pressure plate 179 relatively rotatably contacts the second side frictional member 178.

The cone disc spring 180 is provided between the support plate 181 and the pressure plate 179. The cone disc spring 180 biases the pressure plate 179 towards the frictional members 178.

The support plate 181 is an annular plate member formed in a predetermined shape. The support plate 181 serves as a component of the limiter portion 5. The support plate 181 is fixedly connected, at a radially inward portion thereof, to the flange portion of the hub member 182. The support plate 181 contacts one end (according to the sixth embodiment, a radially inward end) of the cone disc spring 180.

The hub member 182 includes a cylindrical hub portion and the flange portion formed at an outer circumference of the cylindrical hub portion. The hub member 182 serves as a component of the limiter portion 5. An inner circumferential portion of the hub portion of the hub member 182 spline-engages the input shaft 2 of the transmission so that the hub member 182 is arranged to be unrotatable relative to the input shaft 2. The support plate 181 is fixedly supported by the flange portion of the hub member 182. Further, the pressure plate 179 is supported by the flange portion of the hub member 182, at a radially outward portion further than the portion at which the support plate 181 is supported, so as to be axially movable and to be unrotatable relative to the flange portion of the hub member 182. Further, the hub member 182 rotatably contacts, at the flange portion thereof, the first frictional member 176 at a radially outward position further than the portion at which the pressure plate 179 is supported.

The bearing member 183 is employed for rotatably supporting the plate member 172 at the outer circumferential portion of the hub portion of the hub member 182. A bush or any possible bearing mechanism may be employed for the bearing member 183. A positional relationship between the hub member 182 and the plate member 172 is determined by the bearing member 183.

The bearing member 184 is employed for rotatably supporting the plate member 175 at the outer circumferential portion of the cylindrical portion of the plate member 172. A bush or any possible bearing mechanism may be employed for the bearing member 184. A positional relationship between the plate members 172 and 175 is determined by the bearing member 184.

The thrust member 185 is a frictional member provided between the plate member 175 and the cone disc spring 186 at a radially inner side position further than a position of each coil spring 176. The thrust member 185 rotatably contacts the plate member 175.

The cone disc spring 186 is a spring member provided between the thrust member 185 and the plate member 177 (the disc-shaped portion of the plate member 177) at a radially inner side position further than the position of each coil spring 176. The cone disc spring 186 biases the thrust member 185 towards the plate member 175.

The thrust member 187 is a frictional member provided between the plate member 175 and the plate member 177 (the flange portion of the plate member 177) at a radially inner side position further than the position of each coil spring 176. The thrust member 187 rotatably contacts the plate members 175 and 177.

According to the ninth embodiment, the same effect is obtained as the first embodiment. Further, the rigidity of the damper portions 4 and 7 of the torque fluctuation absorbing apparatus can be reduced, and a damping performance of the torque fluctuation absorbing apparatus can be accordingly improved.

Tenth Embodiment

Figure 10:
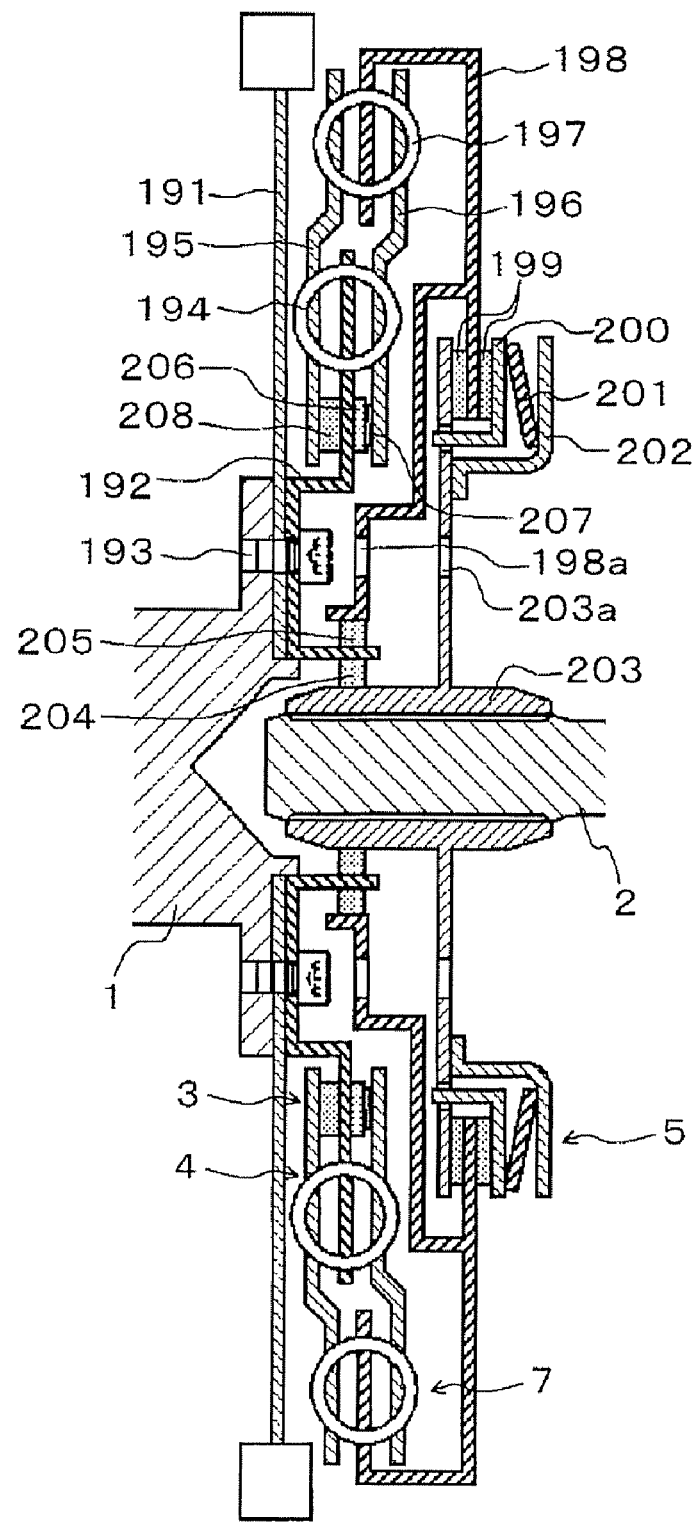
FIG. 10 is a cross sectional view schematically illustrating a torque fluctuation absorbing apparatus according to a tenth embodiment.

A tenth embodiment of the present invention will be described hereinbelow with reference to FIG. 10.

According to the tenth embodiment, the torque fluctuation absorbing apparatus includes a plate member 191, a plate member 192, bolts 193, coil springs 194, plate members 195, 196, coil springs 197, a plate member 198, frictional members 199, a pressure plate 200, a cone disc spring 201, a support plate 202, a hub member 203, bearing members 204, 205, thrust members 206, 208 and a cone disc spring 207.

The plate member (serving as the first member) 191 is a disc-shaped member. The plate member 191 rotates integrally with the output shaft 1. Further, the plate member 191 is assembled, at a radially inward portion thereof, onto the output shaft 1 along with the plate member 192 by means of the bolts 193.

The plate member (serving as the first plate member and also as the second member) 192 includes a cylindrical portion and a flange portion formed at one end (a first side end) of the cylindrical portion. The plate member 192 serves as a component of the hysteresis portion 3 and the damper portion 4. The plate member 192 rotates integrally with the output shaft 1. The plate member 192 is rotatably supported, at an inner circumferential portion of the cylindrical portion thereof, by a cylindrical portion of the hub member 203 via the bearing member 204. Further, the plate member 192 rotatably supports, at an outer circumferential portion of the cylindrical portion thereof, the plate member 198 via the bearing member 205. The plate member 192 is assembled, at a radially inward portion of the flange portion thereof, onto the end portion of the output shaft 1 along with the plate member 191 by means of the bolts 193. Further, a radially outward portion of the plate member 192 extends to be interposed between the plate members 195 and 196. The plate member 192 includes, at a radially outward portion of the flange portion thereof, plural opening portions for respectively accommodating the coil springs 194. End portions of each coil spring 194 directly or indirectly contacts end surfaces (end surfaces in the circumferential direction) of the corresponding opening portion of the plate member 192 so as to be separable therefrom. The thrust members 206, 208 and the cone disc spring 207 are provided at the radially outward portion of the flange portion of the plate member 192, i.e., the portion interposed between the plate members 195 and 196. More specifically, the thrust member 208 is provided at the first side surface of the flange portion of the plate member 192 so as to face the plate member 195, while the thrust member 206 and the cone disc spring 207 are provided at the second side surface of the flange portion of the plate member 192 so as to face the plate member 196.

Each of the bolts 193 serves as a connecting member for fixedly connecting the plate members 191 and 192 to the output shaft 1. Each of the bolts 193 includes a hexagonal hole, for example. The bolts 193 are temporarily assembled onto the plate member 192 by inserting the bolts 193 into holes formed at the plate member 192 when assembling the torque fluctuation absorbing apparatus. Then, when the assembling of the torque fluctuation absorbing apparatus is almost completed, the bolts 193 are tightly respectively screwed onto the threaded holes formed at the end portion of the output shaft 1 by means of a fixing tool (such as a hexagonal wrench, for example), which is allowed to pass through plural holes 203a formed at the hub member 203 and plural holes 198a formed at the plate member 198 from the second side of the torque fluctuation absorbing apparatus.

Each of the coil springs 194 serves as a component of the damper portion 4. The coil springs 194 are respectively accommodated in the opening portions of the plate member 191, opening portions formed at the plate member 195 and opening portions formed at the plate member 196. The end portions (i.e., the end portions in the circumferential direction) of each coil spring 194 directly or indirectly contact the end surfaces (the end surfaces in the circumferential direction) of the corresponding opening portion of the plate members 191, 195 and of the plate member 196 so as to be separable therefrom. When the plate member 191 and the plate member 195 (the plate member 196) rotate relative to each other, each coil spring 194 is compressed and accordingly absorbs a torque fluctuation generated by a difference between a rotation of the plate member 191 and a rotation of the plate member 195 (a rotation of the plate member 196 which rotates integrally with the plate member 195).

The plate member (serving as the second plate member and also as the first/second plate portion of the second plate member) 195 is an annular plate member. The plate member 195 serves as a component of the hysteresis portion 3, the damper portion 4 and the damper portion (the auxiliary damper portion) 7. The plate member 195 is connected to the plate member 196 so as to be integral therewith via a predetermined member. The plate member 195 rotatably contacts, at a radially inward portion thereof, the thrust member 208. Further, the plate member 195 includes the plural opening portions for respectively accommodating the coil springs 194 at a radially outward portion further than the portion at which the thrust member 208 contacts. The end portions (the end portions in the circumferential direction) of each coil spring 194 directly or indirectly contact the end surfaces (the end surfaces in the circumferential direction) of the corresponding opening portion of the plate member 195 so as to be separable therefrom. The plate member 195 further includes, at a radially outward portion thereof, plural opening portions for respectively accommodating the coil springs 197. End portions (end portions in the circumferential direction) of each coil spring 197 directly or indirectly contact end surfaces (end surfaces in the circumferential direction) of the corresponding opening portion of the plate member 195 so as to be separable therefrom.

The plate member (serving as the second plate member and also as the second/first plate portion of the second plate member) 196 is an annular plate member. The plate member 196 serves as a component of the hysteresis portion 3, the damper portion 4 and the damper portion (the auxiliary damper portion) 7. The plate member 196 is connected to the plate member 195 so as to be integral therewith via the predetermined member. The plate member 196 contacts, at a radially inward portion thereof, one end of the cone disc spring 207. Further, the plate member 196 includes the plural opening portions for respectively accommodating the coil springs 194 at a radially outward portion further than the portion at which the cone disc spring 207 contacts. The end portions (the end portions in the circumferential direction) of each coil spring 194 directly or indirectly contact the end surfaces (the end surfaces in the circumferential direction) of the corresponding opening portion of the plate member 196 so as to be separable therefrom. The plate member 196 further includes, at a radially outward portion thereof, plural opening portions for respectively accommodating the coil springs 197. The end portions (the end portions in the circumferential direction) of each coil spring 197 directly or indirectly contact end surfaces (end surfaces in the circumferential direction) of the corresponding opening portion of the plate member 196 so as to be separable therefrom.

Each of the coil springs 197 serves as a component of the damper portion 7. The coil springs 197 are respectively accommodated in the opening portions of the plate members 195, 196 and opening portions formed at the plate member 198. The end portions (i.e., the end portions in the circumferential direction) of each coil spring 197 directly or indirectly contact the end surfaces (the end surfaces in the circumferential direction) of the corresponding opening portion of the plate members 195, 196 and end surfaces (end surfaces in the circumferential direction) of the corresponding opening portion of the plate member 198 so as to be separable therefrom. When the plate member 195 (the plate member 196) and the plate member 198 rotate relative to each other, each coil spring 197 is compressed and accordingly absorbs a torque fluctuation generated by a difference between the rotation of the plate member 195 (the rotation of the plate member 196 which rotate integrally with the plate member 195) and a rotation of the plate member 198. An inertia of the output-side members of the damper portion 4, which are provided at the torque transmitting path formed between the coil springs 194 and the input shaft 2 of the transmission, is set to be equal to or greater than 25% of the inertia of the entire torque fluctuation absorbing apparatus. Herein, the output-side members of the damper portion 4 include the plate members 195, 196, the coil springs 197, the plate member 198, the frictional members 199, the pressure plate 200, the cone disc spring 201, the support plate 202 and the hub member 203. So configured, a noise absorbing performance and a vibration absorbing performance of the torque fluctuation absorbing apparatus are improved.

The plate member 198 includes a cylindrical portion, a first flange portion, a second flange portion and an extending portion. The cylindrical portion is formed at a most radially inward portion of the plate member 198 and is supported by the cylindrical portion of the plate member 192. The first flange portion extends radially outwardly from the cylindrical portion and is formed in a predetermined shape. The second flange portion extends radially inwardly from a radially outward portion of the first flange portion so as to be interposed between the plate members 195 and 196. The extending portion extends radially inwardly from a radially intermediate portion of the first flange portion so as to be interposed between a flange portion of the hub member 203 and the pressure plate 200. The plate member 198 serves as a component of the damper portion 7 and the limiter portion 5. The plate member 198 includes, at the second flange portion thereof (i.e., at the portion interposed between the plate members 195 and 196), the plural opening portion for respectively accommodating the coil springs 197. The end portions (the end portions in the circumferential direction) of each coil spring 197 contact the end portions (the end portions in the circumferential direction) of the corresponding opening portion of the plate member 198 so as to be separable therefrom. The frictional members 199 are fixedly connected to both surfaces of the extending portion of the plate member 198 (i.e., the portion which is interposed between the flange portion of the hub member 203 and the pressure plate 200) by means of rivets, for example. Further, the plate member 198 is rotatably supported, at the cylindrical portion thereof, by the cylindrical portion of the plate member 192 via the bearing member 205. The plate member 198 further includes the hole portions 198a for passing therethrough a fixing tool, such as a hexagonal wrench, for fixing the bolts 193.

The frictional members 199 (first and second side frictional members) are annular members fixedly connected to the both surfaces of the extending portion of the plate member 198 by means of rivets, for example. Each frictional member 199 serves as a component of the limiter portion 5. The frictional members 199 relatively rotatably contact, at frictional surfaces thereof, the pressure plate 200 and the flange portion of the hub member 203.

The pressure plate 200 is an annular member provided between the cone disc spring 201 and one of the frictional members 199 (specifically, the second side frictional member 199). The pressure plate 200 serves as a component of the limiter portion 5. The pressure plate 200 is biased towards the frictional members 199 by the cone disc spring 201. The pressure plate 200 is arranged to be axially movable and to be unrotatable relative to the flange portion of the hub member 203. Further, the pressure plate 200 relatively rotatably contacts the second side frictional member 199.

The cone disc spring 201 is provided between the support plate 202 and the pressure plate 200. The cone disc spring 201 biases the pressure plate 200 towards the frictional members 199.

The support plate 202 is an annular plate member formed in a predetermined shape. The support plate 202 serves as a component of the limiter portion 5. The support plate 202 is fixedly connected, at a radially inward portion thereof, to the flange portion of the hub member 203. The support plate 202 contacts one end (according to the seventh embodiment, a radially inward end) of the cone disc spring 201.

The hub member 203 includes a cylindrical hub portion and the flange portion formed at an outer circumference of the cylindrical hub portion. The hub member 203 serves as a component of the limiter portion 5. An inner circumferential portion of the hub portion of the hub member 203 spline-engages the input shaft 2 of the transmission so that the hub member 203 is arranged to be unrotatable relative to the input shaft 2. Further, the hub member 203 rotatably supports, at an outer circumferential portion thereof, the plate member 192 via the bearing member 204. The support plate 202 is fixedly supported by the flange portion of the hub member 203. Further, the pressure plate 200 is supported by the flange portion of the hub member 203, at a radially outward portion further than the portion at which the support plate 202 is supported, so as to be axially movable and to be unrotatable relative to the flange portion of the hub member 203. Further, the hub member 203 rotatably contacts, at the flange portion thereof, the first frictional member 199 at a radially outward position further than the portion at which the pressure plate 200 is supported. The hub member 203 further includes the hole portions 203a for passing therethrough the fixing tool (such as the hexagonal wrench) for fixing the bolts 193.

The bearing member 204 is employed for rotatably supporting the plate member 192 at the outer circumferential portion of the hub portion of the hub member 203. A bush or any possible bearing mechanism may be employed for the bearing member 204. A positional relationship between the hub member 203 and the plate member 192 is determined by the bearing member 204.

The bearing member 205 is employed for rotatably supporting the plate member 198 at the outer circumferential portion of the cylindrical portion of the plate member 192. A bush or any possible bearing mechanism may be employed for the bearing member 205. A positional relationship between the plate members 192 and 198 is determined by the bearing member 205.

The thrust member 206 is a frictional member provided between the plate member 192 and the cone disc spring 207 at a radially inner side position further than a position of each coil spring 194. The thrust member 206 rotatably contacts the plate member 192.

The cone disc spring 207 is a spring member provided between the thrust member 206 and the plate member 196 at a radially inner side position further than the position of each coil spring 194. The cone disc spring 207 biases the thrust member 206 towards the plate member 192.

The thrust member 208 is a frictional member provided between the plate members 192 and 195 at a radially inner side position further than the position of each coil spring 194. The thrust member 208 rotatably contacts the plate members 192 and 195.

According to the tenth embodiment, the same effect is obtained as the first embodiment. Further, the rigidity of the damper portions 4 and 7 of the torque fluctuation absorbing apparatus can be reduced, and a damping performance of the torque fluctuation absorbing apparatus can be accordingly improved.

Eleventh Embodiment

Figure 11:
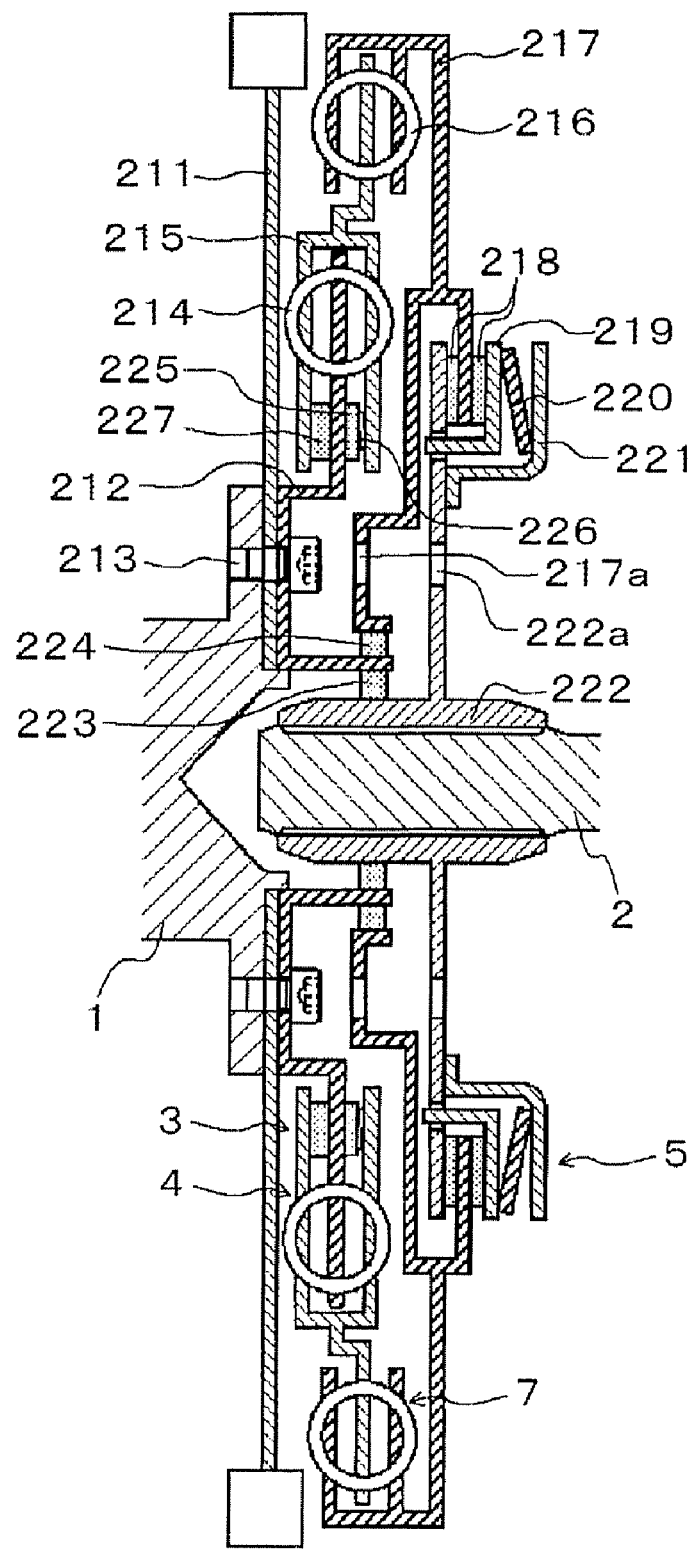
FIG. 11 is a cross sectional view schematically illustrating a torque fluctuation absorbing apparatus according to an eleventh embodiment.

An eleventh embodiment of the present invention will be described hereinbelow with reference to FIG. 11.

According to the eleventh embodiment, the torque fluctuation absorbing apparatus includes a plate member 211, a plate member 212, bolts 213, coil springs 214, a plate member 215, coil springs 216, a plate member 217, frictional members 218, a pressure plate 219, a cone disc spring 220, a support plate 221, a hub member 222, bearing members 223, 224, thrust members 225, 227 and a cone disc spring 226.

The plate member (serving as the first member) 211 is a disc-shaped member. The plate member 211 rotates integrally with the output shaft 1. Further, the plate member 211 is assembled, at a radially inward portion thereof, onto the output shaft 1 along with the plate member 212 by means of the bolts 213.

The plate member (serving as the second member and also as the first plate member) 212 includes a cylindrical portion and a flange portion formed at one end (a first side end) of the cylindrical portion. The plate member 212 serves as a component of the hysteresis portion 3 and the damper portion 4. The plate member 212 rotates integrally with the output shaft 1. The plate member 212 is rotatably supported, at an inner circumferential portion of the cylindrical portion thereof, by a cylindrical portion of the hub member 222 via the bearing member 223. Further, the plate member 212 rotatably supports, at an outer circumferential portion of the cylindrical portion thereof, the plate member 217 via the bearing member 224. The plate member 212 is assembled, at a radially inward portion of the flange portion thereof, onto the end portion of the output shaft 1 along with the plate member 211 by means of the bolts 213. Further, a radially outward portion of the plate member 212 extends to be interposed between first and second side disc-shaped portions of the plate member 215. The plate member 212 includes, at a radially outward portion of the flange portion thereof, plural opening portions for respectively accommodating the coil springs 214. End portions of each coil spring 214 directly or indirectly contacts end surfaces (end surfaces in the circumferential direction) of the corresponding opening portion of the plate member 212 so as to be separable therefrom. The thrust members 227, 225 and the cone disc spring 226 are provided at the radially outward portion of the flange portion of the plate member 212, i.e., the portion interposed between the first and second side disc-shaped portions of the plate member 215. More specifically, the thrust member 227 is provided at a first side surface of the flange portion of the plate member 212 so as to face the first side disc-shaped portion (left side disc-shaped portion in FIG. 11) of the plate member 215, while the thrust member 225 and the cone disc spring 226 are provided at a second side surface of the flange portion of the plate member 212 so as to face the second side disc-shaped portion (right side disc-shaped portion in FIG. 11) of the plate member 215.

Each of the bolts 213 serves as a connecting member for fixedly connecting the plate members 211 and 212 to the output shaft 1. Each of the bolts 213 includes a hexagonal hole, for example. The bolts 213 are temporarily assembled onto the plate member 212 by inserting the bolts 213 into holes formed at the plate member 212 when assembling the torque fluctuation absorbing apparatus. Then, when the assembling of the torque fluctuation absorbing apparatus is almost completed, the bolts 213 are respectively tightly screwed onto the threaded holes formed at the end portion of the output shaft 1 by means of a fixing tool (such as a hexagonal wrench, for example), which is allowed to pass through plural holes 222a formed at the hub member 222 and plural holes 217a formed at the plate member 217 from the second side of the torque fluctuation absorbing apparatus.

Each of the coil springs 214 serves as a component of the damper portion 4. The coil springs 214 are respectively accommodated in the opening portions of the plate member 212 and opening portions formed at the plate member 215. The end portions (i.e., the end portions in the circumferential direction) of each coil spring 214 directly or indirectly contact the end surfaces (the end surfaces in the circumferential direction) of the corresponding opening portion of the plate member 212 and of the plate member 215 so as to be separable therefrom. When the plate member 212 and the plate member 215 rotate relative to each other, each coil spring 214 is compressed and accordingly absorbs a torque fluctuation generated by a difference between a rotation of the plate member 212 and a rotation of the plate member 215.

The plate member (serving as the second plate member) 215 is an annular plate member having the first and second side disc-shaped portions (serving as the first and second plate portions of the second plate member) which interpose therebetween the plate member 212. The plate member 215 serves as a component of the hysteresis portion 3, the damper portion 4 and the damper portion (the auxiliary damper portion) 7. As described above, the thrust member 227 is provided between the plate member 212 and the first side disc-shaped portion of the plate member 215, while the thrust member 225 and the cone disc spring 226 are provided between the plate member 212 and the second side disc-shaped portion of the plate member 215. The plate member 215 includes the plural opening portions at the first and second side disc-shaped portions thereof. Mores specifically, plural openings are formed at the first side disc-shaped portion of the plate member 215 at a radially outward position further than the position at which the thrust member 227 is provided, while plural openings are formed at the second side disc-shaped portion of the plate member 215 at a radially outward position further than the position at which the thrust member 225 and the cone disc spring 226 are provided so as to respectively correspond to the openings formed at the first side disc-shaped portion. Each opening formed at the first side disc-shaped portion and the corresponding opening formed at the second side disc-shaped portion of the plate member 215 structure each opening portion of the plate member 215 for accommodating therein each coil spring 214. The end portions of each coil spring 214 directly or indirectly contact end surfaces (end surfaces in the circumferential direction) of the corresponding opening portion of the plate member 215 so as to be separable therefrom. The plate member 215 further includes, at a radially outward portion thereof, an extending portion which extends radially outwardly from a connecting portion connecting the first and second side disc-shaped portions so as to be interposed between first and second side extending portions formed at a radially outward portion of the plate member 217. The plate member 215 includes, at the extending portion, plural opening portions for respectively accommodating the coil springs 216. End portions of each coil spring 216 directly or indirectly contact end surfaces (end surfaces in the circumferential direction) of the corresponding opening portion of the plate member 215 so as to be separable therefrom.

Each of the coil springs 216 serves as a component of the damper portion 7. The coil springs 216 are respectively accommodated in the opening portions of the plate members 215 and opening portions formed at the plate member 217. The end portions (i.e., the end portions in the circumferential direction) of each coil spring 216 directly or indirectly contact the end surfaces (the end surfaces in the circumferential direction) of the corresponding opening portion of the plate member 215 and end surfaces (end surfaces in the circumferential direction) of the corresponding opening portion of the plate member 217 so as to be separable therefrom. When the plate member 215 and the plate member 217 rotate relative to each other, each coil spring 216 is compressed and accordingly absorbs a torque fluctuation generated by a difference between the rotation of the plate member 215 and a rotation of the plate member 217. An inertia of the output-side members of the damper portion 4, which are provided at the torque transmitting path formed between the coil springs 214 and the input shaft 2 of the transmission, is set to be equal to or greater than 25% of the inertia of the entire torque fluctuation absorbing apparatus. Herein, the output-side members of the damper portion 4 include the plate member 215, the coil spring 216, the plate member 217, the frictional members 218, the pressure plate 219, the cone disc spring 220, the support plate 221 and the hub member 222. So configured, a noise absorbing performance and a vibration absorbing performance of the torque fluctuation absorbing apparatus are improved.

The plate member 217 includes a cylindrical portion, a flange portion, and the first and second side extending portions. The flange portion extends radially outwardly from the cylindrical portion. The first and second side extending portions extends radially inwardly from an outer circumferential portion of the flange portion. The extending portion of the plate member 215 is interposed between the first and second side extending portions of the plate member 217. The plate member 217 further includes an extending portion which extends radially inwardly from a radially intermediate portion of the flange portion so as to be interposed between a flange portion of the hub member 222 and the pressure plate 219. The plate member 217 serves as a component of the damper portion 7 and the limiter portion 5. The plate member 217 includes the plural opening portions at the first and second side extending portions thereof. Mores specifically, plural openings are formed at the first side extending portion (i.e., left side extending portion in FIG. 11) of the plate member 217, while plural openings are formed at the second side extending portion (i.e., right side extending portion in FIG. 11) so as to respectively correspond to the openings formed at the first side extending portion. Each opening formed at the first side extending portion and the corresponding opening formed at the second side extending portion of the plate member 217 structure each opening portion of the plate member 217 for accommodating therein each coil spring 216. The end portions of each coil spring 216 directly or indirectly contact the end surfaces (the end surfaces in the circumferential direction) of the corresponding opening portion of the plate member 217 so as to be separable therefrom.

The frictional members 218 are fixedly connected to both surfaces of the extending portion, which extends from the intermediate portion of the flange portion of the plate member 217 so as to be interposed between the pressure plate 219 and the flange portion of the hub member 222, by means of rivets, for example. Further, the plate member 217 is rotatably supported, at an inner circumferential portion of the cylindrical portion thereof, by the cylindrical portion of the plate member 212 via the bearing member 224. The plate member 217 further includes the hole portions 217a for passing therethrough the fixing tool (such as a hexagonal wrench) for fixing the bolts 213.

The frictional members 218 (first and second side frictional members) are annular members fixedly connected to the both surfaces of the extending portion of the plate member 217 by means of rivets, for example. Each frictional member 218 serves as a component of the limiter portion 5. The frictional members 218 relatively rotatably contact, at frictional surfaces thereof, the pressure plate 219 and the flange portion of the hub member 222.

The pressure plate 219 is an annular member provided between the cone disc spring 220 and one of the frictional members 218 (specifically, the second side frictional member 218). The pressure plate 219 serves as a component of the limiter portion 5. The pressure plate 219 is biased towards the frictional members 218 by the cone disc spring 220. The pressure plate 219 is arranged to be axially movable and to be unrotatable relative to the flange portion of the hub member 222. Further, the pressure plate 219 relatively rotatably contacts the second side frictional member 218.

The cone disc spring 220 is provided between the support plate 221 and the pressure plate 219. The cone disc spring 220 biases the pressure plate 219 towards the frictional members 218.

The support plate 221 is an annular plate member formed in a predetermined shape. The support plate 221 serves as a component of the limiter portion 5. The support plate 221 is fixedly connected, at a radially inward portion thereof, to the flange portion of the hub member 222. The support plate 221 contacts one end (according to the seventh embodiment, a radially inward end) of the cone disc spring 220.

The hub member 222 includes the cylindrical hub portion and the flange portion formed at an outer circumference of the cylindrical hub portion. The hub member 222 serves as a component of the limiter portion 5. An inner circumferential portion of the hub portion of the hub member 222 spline-engages the input shaft 2 of the transmission so that the hub member 222 is arranged to be unrotatable relative to the input shaft 2. Further, the hub member 222 rotatably supports, at an outer circumferential portion of the cylindrical portion thereof, the plate member 212 via the bearing member 223. The support plate 221 is fixedly supported by the flange portion of the hub member 222. Further, the pressure plate 219 is supported by the flange portion of the hub member 222, at a radially outward portion further than the portion at which the support plate 221 is supported, so as to be axially movable and to be unrotatable relative to the flange portion of the hub member 222. Further, the hub member 222 rotatably contacts, at the flange portion thereof, the first frictional member 218 at a radially outward position further than the portion at which the pressure plate 219 is supported. The hub member 222 further includes the hole portions 222a for passing therethrough the fixing tool (such as the hexagonal wrench) for fixing the bolts 213.

The bearing member 223 is employed for rotatably supporting the plate member 212 at the outer circumferential portion of the hub portion of the hub member 222. A bush or any possible bearing mechanism may be employed for the bearing member 223. A positional relationship between the hub member 222 and the plate member 212 is determined by the bearing member 223.

The bearing member 224 is employed for rotatably supporting the plate member 217 at the outer circumferential portion of the cylindrical portion of the plate member 212. A bush or any possible bearing mechanism may be employed for the bearing member 224. A positional relationship between the plate members 212 and 217 is determined by the bearing member 224.

The thrust member 225 is a frictional member provided between the plate member 212 and the cone disc spring 226 at a radially inner side position further than a position of each coil spring 214. The thrust member 225 rotatably contacts the plate member 212.

The cone disc spring 226 is a spring member provided between the thrust member 225 and the plate member 215 at a radially inner side position further than the position of each coil spring 214. The cone disc spring 226 biases the thrust member 225 towards the plate member 212.

The thrust member 227 is a frictional member provided between the plate members 212 and 215 at a radially inner side position further than the position of each coil spring 214. The thrust member 227 rotatably contacts the plate members 212 and 215.

According to the eleventh embodiment, the same effect is obtained as the first embodiment. Further, the rigidity of the damper portions 4 and 7 of the torque fluctuation absorbing apparatus can be reduced, and a damping performance of the torque fluctuation absorbing apparatus can be accordingly improved.

Twelfth Embodiment

Figure 12:
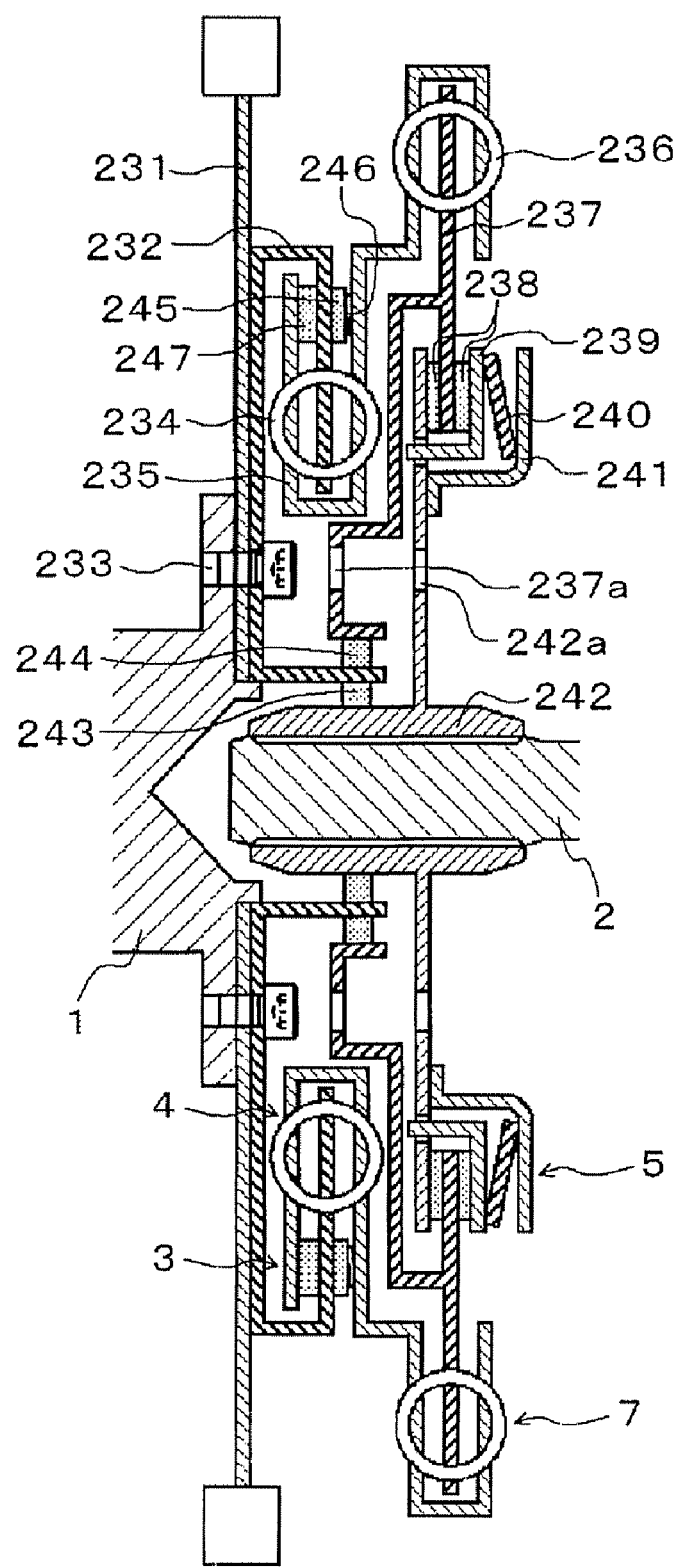
FIG. 12 is a cross sectional view schematically illustrating a torque fluctuation absorbing apparatus according to a twelfth embodiment.

A twelfth embodiment of the present invention will be described hereinbelow with reference to FIG. 12.

According to the twelfth embodiment, the torque fluctuation absorbing apparatus includes a plate member 231, a plate member 232, bolts 233, coil springs 234, a plate member 235, coil springs 236, a plate member 237, frictional members 238, a pressure plate 239, a cone disc spring 240, a support plate 241, a hub member 242, bearing members 243, 244, thrust members 245, 247 and a cone disc spring 246.

The plate member (serving as the first member) 231 is a disc-shaped member. The plate member 231 rotates integrally with the output shaft 1. Further, the plate member 231 is assembled, at a radially inward portion thereof, onto the output shaft 1 along with the plate member 232 by means of the bolts 233.

The plate member (serving as the second member and also as the first plate member) 232 includes a cylindrical portion and a flange portion formed at one end (a first side end) of the cylindrical portion. The plate member 232 further includes an extending portion extending from an outer circumferential portion of the flange portion so as to be interposed between a disc-shaped portion and a flange portion of the plate member 235. The plate member 232 serves as a component of the hysteresis portion 3 and the damper portion 4. The plate member 232 rotates integrally with the output shaft 1. The plate member 232 is rotatably supported, at an inner circumferential portion of the cylindrical portion thereof, by a cylindrical portion of the hub member 242 via the bearing member 243. Further, the plate member 232 rotatably supports, at an outer circumferential portion of the cylindrical portion thereof, the plate member 237 via the bearing member 244. The plate member 232 is assembled, at a radially inward portion of the flange portion thereof, onto the end portion of the output shaft 1 along with the plate member 231 by means of the bolts 233. The plate member 232 includes, at the extending portion thereof, plural opening portions for respectively accommodating the coil springs 234. End portions of each coil spring 234 directly or indirectly contacts end surfaces (end surfaces in the circumferential direction) of the corresponding opening portion of the plate member 232 so as to be separable therefrom. The thrust members 247, 245 and the cone disc spring 246 are provided at the extending portion of the plate member 232, i.e., the portion interposed between the disc-shaped portion and the flange portion of the plate member 235. More specifically, the thrust member 247 is provided at a first side surface of the extending portion of the plate member 212 so as to face the disc-shaped portion of the plate member 235, while the thrust member 245 and the cone disc spring 246 are provided at a second side surface of the extending portion of the plate member 232 so as to face the flange portion of the plate member 235.

Each of the bolts 233 serves as a connecting member for fixedly connecting the plate members 231 and 232 to the output shaft 1. Each of the bolts 233 includes a hexagonal hole, for example. The bolts 233 are temporarily assembled onto the plate member 232 by inserting the bolts 233 into holes formed at the plate member 232 when assembling the torque fluctuation absorbing apparatus. Then, when the assembling of the torque fluctuation absorbing apparatus is almost completed, the bolts 233 are respectively tightly screwed onto the threaded holes formed at the end portion of the output shaft 1 by means of a fixing tool (such as a hexagonal wrench, for example), which is allowed to pass through plural holes 242a formed at the hub member 242 and plural holes 237a formed at the plate member 237 from the second side of the torque fluctuation absorbing apparatus.

Each of the coil springs 234 serves as a component of the damper portion 4. The coil springs 234 are respectively accommodated in the opening portions of the plate member 232 and opening portions formed at the plate member 235. The end portions (i.e., the end portions in the circumferential direction) of each coil spring 234 directly or indirectly contact the end surfaces (the end surfaces in the circumferential direction) of the corresponding opening portion of the plate member 232 and of the plate member 235 so as to be separable therefrom. When the plate member 232 and the plate member 235 rotate relative to each other, each coil spring 234 is compressed and accordingly absorbs a torque fluctuation generated by a difference between a rotation of the plate member 232 and a rotation of the plate member 235.

The plate member (serving as the second plate member) 235 includes the disc-shaped portion, the flange portion and an extending portion. The flange portion extends radially outwardly from a radially inward portion of the disc-shaped portion of the plate member 235 (the disc-shaped portion which is provided at adjacent to the output shaft 1 of the engine). The plate member 232 is interposed between the disc-shaped portion (serving as the first/second plate portion) and the flange portion (serving as the second/first portion) of the plate member 235. The extending portion extends radially inwardly from a radially outward portion of the flange portion of the plate member 235. A radially outward portion of the plate member 237 is interposed between the flange portion and the extending portion of the plate member 235. The plate member 235 serves as a component of the hysteresis portion 3, the damper portion 4 and the damper portion (the auxiliary damper portion) 7. As described above, the thrust member 247 is provided between the plate member 232 and the disc-shaped portion of the plate member 235, while the thrust member 245 and the cone disc spring 246 are provided between the plate member 232 and the flange portion of the plate member 235. The plate member 235 includes the plural opening portions at the flange portion and the disc-shaped portion thereof. Mores specifically, plural openings are formed at the disc-shaped portion of the plate member 235 at a radially inward position further than the position at which the thrust member 247 is provided, while plural openings are formed at the flange portion of the plate member 235 at a radially inward position further than the position at which the thrust member 245 and the cone disc spring 246 are provided so as to respectively correspond to the openings formed at the disc-shaped portion. Each opening formed at the disc-shaped portion and the corresponding opening formed at the flange portion structure each opening portion of the plate member 235 for accommodating therein each coil spring 234. The end portions of each coil spring 234 directly or indirectly contact end surfaces (end surfaces in the circumferential direction) of the corresponding opening portion of the plate member 235 so as to be separable therefrom. The plate member 235 further includes, at a radially outward portion of the flange portion and the extending portion thereof, plural opening portions for respectively accommodating the coil springs 236. Mores specifically, plural openings are formed at the radially outward portion of the flange portion of the plate member 235, while plural openings are formed at the extending portion of the plate member 235 so as to respectively correspond to the openings formed at the radially outward portion of the flange portion. Each opening formed at the radially outward portion of the flange portion and the corresponding opening formed at the extending portion structure each opening portion of the plate member 235 for accommodating therein each coil spring 236. The end portions of each coil spring 236 directly or indirectly contact end surfaces (end surfaces in the circumferential direction) of the corresponding opening portion of the plate member 235 so as to be separable therefrom.

Each of the coil springs 236 serves as a component of the damper portion 7. The coil springs 236 are respectively accommodated in the opening portions of the plate members 235 and opening portions formed at the plate member 237. The end portions (i.e., the end portions in the circumferential direction) of each coil spring 236 directly or indirectly contact the end surfaces (the end surfaces in the circumferential direction) of the corresponding opening portion of the plate member 235 and end surfaces (end surfaces in the circumferential direction) of the corresponding opening portion of the plate member 237 so as to be separable therefrom. When the plate member 235 and the plate member 237 rotate relative to each other, each coil spring 236 is compressed and accordingly absorbs a torque fluctuation generated by a difference between the rotation of the plate member 235 and a rotation of the plate member 237. An inertia of the output-side members of the damper portion 4, which are provided at the torque transmitting path formed between the coil springs 234 and the input shaft 2 of the transmission, is set to be equal to or greater than 25% of the inertia of the entire torque fluctuation absorbing apparatus. Herein, the output-side members of the damper portion 4 include the plate member 236, the coil spring 236, the plate member 237, the frictional members 238, the pressure plate 239, the cone disc spring 240, the support plate 241 and the hub member 242. So configured, a noise absorbing performance and a vibration absorbing performance of the torque fluctuation absorbing apparatus are improved.

The plate member 237 includes a cylindrical portion, a flange portion, and an extending portion. The cylindrical portion is formed at a radially inward portion of the plate member 237. The flange portion extends radially outwardly from one end of the cylindrical portion so as to be formed in a predetermined shape. A radially outward portion of the flange portion of the plate member 237 is interposed between the flange portion and the extending portion of the plate member 235. The extending portion extends radially inwardly from a radially intermediate portion of the flange portion of the plate member 237 so as to be interposed between a flange portion of the hub member 242 and the pressure plate 239. The plate member 237 serves as a component of the damper portion 7 and the limiter portion 5. The plate member 237 includes, at the radially outward portion of the flange portion thereof, the plural opening portions for respectively accommodating the coil springs 236. The end portions of each coil spring 236 directly or indirectly contact the end surfaces (the end surfaces in the circumferential direction) of the corresponding opening portion of the plate member 237 so as to be separable therefrom. The frictional members 238 are fixedly connected to both surfaces of the extending portion (i.e., the portion interposed between the flange portion of the hub member 242 and the pressure plate 239) of the plate member 237 by means of rivets, for example. Further, the plate member 237 is rotatably supported, at an inner circumferential portion of the cylindrical portion thereof, by the cylindrical portion of the plate member 232 via the bearing member 244. The plate member 237 further includes the hole portions 237a for passing therethrough the fixing tool (such as a hexagonal wrench) for fixing the bolts 233.

The frictional members 238 (first and second side frictional members) are annular members fixedly connected to the both surfaces of the extending portion of the plate member 237 by means of rivets, for example. Each frictional member 238 serves as a component of the limiter portion 5. The frictional members 238 relatively rotatably contact, at frictional surfaces thereof, the pressure plate 239 and the flange portion of the hub member 242.

The pressure plate 239 is an annular member provided between the cone disc spring 240 and one of the frictional members 238 (specifically, the second side frictional member 238). The pressure plate 239 serves as a component of the limiter portion 5. The pressure plate 239 is biased towards the frictional members 238 by the cone disc spring 240. The pressure plate 239 is arranged to be axially movable and to be unrotatable relative to the flange portion of the hub member 242. Further, the pressure plate 239 relatively rotatably contacts the second side frictional member 238.

The cone disc spring 240 is provided between the support plate 241 and the pressure plate 239. The cone disc spring 240 biases the pressure plate 239 towards the frictional members 238.

The support plate 241 is an annular plate member formed in a predetermined shape. The support plate 241 serves as a component of the limiter portion 5. The support plate 241 is fixedly connected, at a radially inward portion thereof, to the flange portion of the hub member 242. The support plate 241 contacts one end (according to the seventh embodiment, a radially inward end) of the cone disc spring 240.

The hub member 242 includes the cylindrical hub portion and the flange portion formed at an outer circumference of the cylindrical hub portion. The hub member 242 serves as a component of the limiter portion 5. An inner circumferential portion of the hub portion of the hub member 242 spline-engages the input shaft 2 of the transmission so that the hub member 242 is arranged to be unrotatable relative to the input shaft 2. Further, the hub member 242 rotatably supports, at an outer circumferential portion of the hub portion thereof, the plate member 232 via the bearing member 243. The support plate 241 is fixedly supported by the flange portion of the hub member 242. Further, the pressure plate 239 is supported by the flange portion of the hub member 242, at a radially outward portion further than the portion at which the support plate 241 is supported, so as to be axially movable and to be unrotatable relative to the flange portion of the hub member 242. Further, the hub member 242 rotatably contacts, at the flange portion thereof, the first frictional member 238 at a radially outward position further than the portion at which the pressure plate 239 is supported. The hub member 242 further includes the hole portions 242a for passing therethrough the fixing tool (such as the hexagonal wrench) for fixing the bolts 233.

The bearing member 243 is employed for rotatably supporting the plate member 232 at the outer circumferential portion of the hub portion of the hub member 242. A bush or any possible bearing mechanism may be employed for the bearing member 243. A positional relationship between the hub member 242 and the plate member 232 is determined by the bearing member 243.

The bearing member 244 is employed for rotatably supporting the plate member 237 at the outer circumferential portion of the cylindrical portion of the plate member 232. A bush or any possible bearing mechanism may be employed for the bearing member 244. A positional relationship between the plate members 232 and 237 is determined by the bearing member 244.

The thrust member 245 is a frictional member provided between the plate member 232 and the cone disc spring 246 at a radially inner side position further than a position of each coil spring 234. The thrust member 245 rotatably contacts the plate member 232.

The cone disc spring 246 is a spring member provided between the thrust member 245 and the plate member 235 at a radially inner side position further than the position of each coil spring 234. The cone disc spring 246 biases the thrust member 245 towards the plate member 232.

The thrust member 247 is a frictional member provided between the plate members 232 and 235 at a radially inner side position further than the position of each coil spring 234. The thrust member 247 rotatably contacts the plate members 232 and 235.

According to the twelfth embodiment, the same effect is obtained as the first embodiment. Further, the rigidity of the damper portions 4 and 7 of the torque fluctuation absorbing apparatus can be reduced, and a damping performance of the torque fluctuation absorbing apparatus can be accordingly improved.

According to the first to twelfth embodiments, the second plate member (plate members 16, 37, 38, 55, 56, 77, 78, 101, 114, 135, 157, 158, 177, 195, 196, 215, 235) spline-engages the input shaft 2 of the transmission. Accordingly, the second plate member is connected to the input shaft 2 of the transmission.

Further, the first plate member (according to the first to twelfth embodiments, plate members 13, 33, 53, 73, 99, 111, 133, 153, 175, 192, 212, 232) is connected to the output shaft 1 of the engine to rotate integrally therewith.

The torque fluctuation absorbing apparatus further includes the limiter portion 5 provided between the first plate member (plate members 13, 33, 53, 73, 99, 111, 133, 153, 175, 192, 212, 232) and the second plate member (plate members 16, 37, 38, 55, 56, 77, 78, 101, 114, 135, 157, 158, 177, 195, 196, 215, 235). The limiter portion 5 generates a skidding when the torque fluctuation being equal to or greater than a set value is generated.

The torque fluctuation absorbing apparatus further includes the hysteresis portion 3 provided between the first plate member (plate members 13, 33, 53, 73, 99, 111, 153, 175, 192, 212, 232, and the hub member 133) and the second plate member (plate members 16, 37, 38, 55, 56, 77, 78, 114, 135, 157, 158, 177, 195, 196, 215, 235, and the hub member 101). The hysteresis portion 3 generating a frictional force and thereby reducing a torque fluctuation to be generated between the output shaft 1/6 of the engine and the input shaft 2 of the transmission.

The torque fluctuation absorbing apparatus further includes the input-side member, the output-side member and the bearing member. According to the first to twelfth embodiment, each of the plate member 11, the inertial member 12, the plate member 13, the bolts 14 (first embodiment), the plate member 31, the bolts 32, the plate member 33, the bolts 34, the inertial member 35 (second embodiment), the plate member 51, the bolts 52, the plate member 53 (third embodiment), the plate member 71, the bolts 72, the plate member 73, the bolts 74, the inertial member 75 (fourth embodiment), the plate member 91, the bolts 92, the plate member 93, the bolts 94, the support plate 95, the cone disc spring 96, the pressure plate 97, the frictional members 98, the plate member 99 (fifth embodiment), the plate member 111, the bolts 112 (sixth embodiment), the hub member 133 (seventh embodiment), the plate member 151, the bolts 152, the plate member 153, the bolts 154, the inertial member 155 (eighth embodiment), the plate member 171, the plate member 172, the bolts 173, the coil springs 174, the plate member 175 (ninth embodiment), the plate member 191, the plate member 192, the bolts 193 (tenth embodiment), the plate member 212 (eleventh embodiment) and the plate member 232 (twelfth embodiment) serves as the input-side member. The input-side member is provided at the torque transmitting path to be established between the output shaft 1/6 of the engine and the coil springs (15, 36, 54, 76, 100, 113, 134, 156, 176, 194, 214, 234) of the damper portion 4. According to the first to twelfth embodiment, each of the plate member 16, the frictional members 17, the pressure plate 18, the cone disc spring 19, the support plate 20, the hub member 21 (first embodiment), the plate member 37, the plate member 38, the frictional members 39, the pressure plate 40, the cone disc spring 41, the support plate 42, the hub member 43 (second embodiment), the plate member 55, the plate member 56, the frictional members 57, the pressure plate 58, the cone disc spring 59, the support plate 60, the hub member 61 (third embodiment), the plate member 77, the plate member 78, the frictional members 79, the pressure plate 80, the cone disc spring 81, the support plate 82, the hub member 83 (fourth embodiment), the hub member 101 (fifth embodiment), the plate member 114, the frictional members 115, the cover plate 116, the pressure plate 117, the cone disc spring 118, the support plate 119, the bolts 120, the ring member 121, the hub member 122 (sixth embodiment), the plate member 135, the frictional members 136, the pressure plate 137, the cone disc spring 138, the support plate 139, the hub member 140 (seventh embodiment), the plate member 157, the plate member 158, the frictional members 159, the pressure plate 160, the cone disc spring 161, the support plate 162, the hub member 163 (eighth embodiment), the plate member 177, the frictional members 178, the pressure plate 179, the cone disc spring 180, the support plate 181, the hub member 182 (ninth embodiment), the plate members 195, 196, the coil springs 197, the plate member 198, the frictional members 199, the pressure plate 200, the cone disc spring 201, the support plate 202, the hub member 203 (tenth embodiment), the plate member 215, the coil springs 216, the plate member 217 (eleventh embodiment), the plate member 235, the coil springs 236 and the plate member 237 (twelfth embodiment)

serves as the output-side member. The output-side member is provided at the torque transmitting path to be established between the input shaft 2 of the transmission and the coil springs (15, 36, 54, 76, 100, 113, 134, 156, 176, 194, 214, 234) of the damper portion 4. The bearing member (bearing members 23, 24, 44, 45, 62, 63, 84, 85, 102, 103, 123, 124, 141, 142, 164, 165, 183, 184, 204, 205, 223, 224, 243, 244) is provided between the input-side member and the output-side member.

Further according to the first to twelfth embodiments, the inertia of the output-side member provided at the torque transmitting path to be established between the input shaft 2 of the transmission and the coil springs of the damper portion 4 is set to be equal to or greater than 25% of the inertia of the entire torque fluctuation absorbing apparatus.

According to the ninth to twelfth embodiments, the torque fluctuation absorbing apparatus further includes the auxiliary damper portion 7. The auxiliary damper portion 7 is provided at the torque transmitting path to be established between the damper portion 4 and one of the output shaft 1 of the engine and the input shaft 2 of the transmission at the position offset in the radial direction of the first and second plate members (plate members 175, 192, 212, 232 and the plate members 177, 195, 196, 215, 235) from the position of the damper portion 4. The auxiliary damper portion 7 generates a spring force for absorbing the torque fluctuation generated between the output shaft 1 of the engine and the input shaft 2 of the transmission.

Further, according to the seventh embodiment, the output shaft 6 of the engine includes the stepped shaft portion 6a protruding therefrom towards the input shaft 2 of the transmission. The input-side member (the hub member 133) provided at the torque transmitting path to be established between the output shaft 6 of the engine and the coil springs 134 of the damper portion 4 engages the stepped portion 6a. The input shaft 2 of the transmission includes the stepped shaft portion 2a protruding therefrom towards the output shaft 6 of the engine. The output-side member (the plate member 135, the frictional members 136, the pressure plate 137, the cone disc spring 138, the support plate 139, the hub member 140) provided at the torque transmitting path to be established between the input shaft 2 of the transmission and the coil springs 134 of the damper portion 4 engages the stepped shaft portion 2a.

Further, according to the first embodiment, the plate member 13 includes the hole portion 13a (the first opening portion). The plate member 16 includes the hole portion 16a (the second opening portion). The bolts 14 (the connecting member) are allowed to pass through the hole portions 13a, 16a from the transmission side, Accordingly, the input-side member (the plate member 11, the inertial member 12, the plate member 13, the bolts 14) provided at the torque transmitting path to be established between the output shaft 1 of the engine and the coil springs 15 of the damper portion 4 is connected to the output shaft 1 of the engine by means of the bolts 14.

According to the fourth embodiment, the torque fluctuation absorbing apparatus further includes the plate member 71 (first member) assembled onto the output shaft 1 of the engine, and the plate member 73 (second member) assembled onto the plate member 71 by the bolts 74 (connecting member). The bolts 74 are assembled onto the plate members 71 and 73 from the engine side for connecting the plate members 71 and 73 to each other.

According to the first embodiment, the torque fluctuation absorbing apparatus further includes the plate member 11 (first member) assembled onto the output shaft 1 of the engine, and the plate member 13 (second member) assembled onto the plate member 11 by the bolts 14 (connecting member). The plate member 13 includes the hole portion 13a (first opening portion). The plate member 16 includes the hole portion 16a (second opening portion). The bolts 14 are allowed to pass through the hole portions 13a and 16a from the transmission side for connecting the plate members 11 and 13 to each other.

Further, according to the sixth embodiment and ninth to twelfth embodiments, a predetermined component of the torque fluctuation absorbing apparatus includes the hole portion. According to the embodiments, each of the plate member 114, the hub member 122 (sixth embodiment), the plate member 175, the hub member 182 (ninth embodiment), the plate member 198, the hub member 203 (tenth embodiment), the plate member 217, the hub member 222 (eleventh embodiment), the plate member 237 and the hub member 242 (twelfth embodiment) serves as the predetermined component of the torque fluctuation absorbing apparatus. A size of the hole portion (114a, 122a, 175a, 182a, 198a, 203a, 217a, 222a, 237a, 242a) is set to be smaller than a size of bolts (112, 173, 193, 213, 233) for connecting the input-side member (the plate member 111, the bolts 112, plate members 171, 172, the bolts 173, the coil springs 174, the plate member 175, the plate members 191, 192, the bolts 193, the plate members 212 and 232) provided at the torque transmitting path to be established between the output shaft 1 of the engine and the coil springs (113, 176, 194, 214, 234) of the damper portion 4 to the output shaft of the engine. The bolts (112, 173, 193, 213, 233) is fixed to the output shaft 1 of the engine for fixedly connecting the input-side member to the output shaft 1 of the engine by means of a fixing tool (such as a hexagonal wrench) allowed to pass through the hole portion (114a, 122a, 175a, 182a, 198a, 203a, 217a, 222a, 237a, 242a) of the predetermined component from the transmission side.

Still further, according to the eighth embodiment, the plate members 157 and 158 (second plate member) include the accommodating portion for accommodating therein each coil spring 156. The accommodating portion includes the fluid-tight structure for reducing a lubricant provided around each coil spring 156 from flowing from the accommodating portion.

Still further, according to the eighth embodiment, the guide plate 169 is provided at the radially outer side of each coil spring 156 within the accommodating portion. Accordingly, the guide plate 169 guides compressing and extending movements of each coil spring 156.

According to the ninth embodiment, the torque fluctuation absorbing apparatus further includes the plate member 171 (first member) assembled onto the output shaft 1 of the engine, and the plate member 172 (second member) assembled onto the plate member 171 to be integral therewith before assembling the plate member 171 onto the output shaft 1 of the engine. The bolts 173 (connecting member) connect the plate members 171 and 172 to the output shaft 1 of the engine. Further, one of the plate member 175 (first plate member) and the plate member 177 (second plate member) includes the hole portion (according to the embodiment, the hole portion 175a) at a radially inner side position further than the position of the damper portion 4. The bolts 173 are assembled onto the output shaft 1 of the engine through the hole portion 175a for connecting the plate members 171 and 172 to the output shaft 1 of the engine.

Still further, according to the ninth embodiment, the bolts 173 (connecting member) for connecting the input-side member (the plate member 171, the plate member 172, the bolts 173, the coil springs 174, the plate member 175) provided at the torque transmitting path to be established between the output shaft 1 of the engine and the coil springs 176 of the damper portion 4 to the output shaft 1 of the engine is assembled onto the input-side member before connecting the input-side member to the output shaft 1 of the engine. Further, one of the plate member 175 (first plate member) and the plate member 177 (second plate member) includes the hole portion (according to the embodiment, the hole portion 175*a*). T bolts 173 are fixed to the output shaft 1 of the engine for fixedly connecting the input-side member to the output shaft 1 of the engine by means of a fixing tool (such as a hexagonal wrench) allowed to pass through the hole portion 175*a* from the transmission side.

Still further according to the first to twelfth embodiments described above, the inertia of the output-side member provided at the torque transmitting path to be established between the damper portion 4 and the input shaft 2 of the transmission (second rotational shaft) is greater than the inertial of the input-side member provided at the torque transmitting path to be established between the output shaft 1 of the engine (first rotational shaft) and the damper portion 4.

Further, the first and second plate portions of the second plate member (plate members 16, 37, 38, 55, 56, 77, 78, 101, 114, 135, 157, 158, 177, 195, 196, 215, 235) interpose therebetween one of the radially inward portion and the radially outward portion of the first plate member (plate members 13, 33, 53, 73, 99, 111, 133, 153, 175, 192, 212, 232).

Due to the above described structure, the inertia of the input-side members of the damper portion 4 is set to be lower, whereas the inertia of the output-side members of the damper portion 4 is set to be higher. Accordingly, the damping performance of the damper portion 4 is satisfactory obtained. Further, the inertia of the output-side members of the damper portion 4 is set to be high while restraining the inertia of the input-side members of the damper portion 4 and a total weight of the torque fluctuation absorbing apparatus. Accordingly, an acceleration performance of the vehicle is not deteriorated. Still further, the torque fluctuation absorbing apparatus is assembled onto the output shaft 1 of the engine by inserting the bolts from the transmission side (from the right side in the drawings). Thus, the structure of the torque fluctuation absorbing apparatus according to the embodiments described above simplifies an assembling procedure for assembling the torque fluctuation absorbing apparatus onto the output shaft 1 of the engine.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A torque fluctuation absorbing apparatus for absorbing a torque fluctuation generated between an engine and a transmission, comprising:
   a damper portion having:
      a first plate member;
      a second plate member including a first plate portion and a second plate portion to interpose therebetween the first plate member; and
      a plurality of coil springs provided between the first and second plate members, the plurality of coil springs arranged to compress when the first and second plate members move relative to each other thereby absorbing a torque fluctuation generated by a difference between a rotation of the first plate member and a rotation of the second plate member; and
   an auxiliary damper portion provided at a torque transmitting path to be established between the damper portion and an input shaft of the transmission at a position offset in an outer radial direction of the first and second plate members away from a position of the damper portion,
   wherein the first plate member is connected to an output shaft of the engine,
   the second plate member is connected to the input shaft of the transmission, and
   wherein the auxiliary damper portion generates a spring force for absorbing a torque fluctuation generated between the output shaft of the engine and the input shaft of the transmission, and the damper portion and the auxiliary damper portion are disposed at positions offset in an axial direction from each other, the auxiliary damper portion being closer to the second plate member than the damper portion in the axial direction.

2. A torque fluctuation absorbing apparatus according to claim 1, wherein
   one of the damper portion and the auxiliary damper portion is established at the output shaft side of the engine of the torque transmission path is disposed at an inner side relative to the other of the damper portion and the auxiliary damper portion.

3. A torque fluctuation absorbing apparatus according to claim 2, further comprising:
   one of the damper portion and the auxiliary damper portion disposed at an inner side relative to the other of the damper portion and the auxiliary damper portion is positioned closer to the output shaft of the engine than the other of the damper portion and the auxiliary damper portion regarding an axial direction of the torque fluctuation absorbing apparatus.

4. A torque fluctuation absorbing apparatus according to claim 1, further comprising:
   a limiter portion provided between the first plate member and the second plate member, the limiter portion generating a skidding when the torque fluctuation being equal to or greater than a set value is generated.

5. A torque fluctuation absorbing apparatus according to claim 1, further comprising:
   a hysteresis portion provided between the first plate member and the second plate member, the hysteresis portion generating a frictional force and thereby reducing a torque fluctuation to be generated between the output shaft of the engine and the input shaft of the transmission.

6. A torque fluctuation absorbing apparatus according to claim 1, further comprising:
   an input-side member provided at a torque transmitting path to be established between the output shaft of the engine and the coil springs of the damper portion;
   an output-side member provided at a torque transmitting path to be established between the input shaft of the transmission and the coil springs of the damper portion; and
   a bearing member provided between the input-side member and the output-side member.

7. A torque fluctuation absorbing apparatus according to claim 1, wherein
   an inertia of an output-side member provided at a torque transmitting path to be established between the input shaft of the transmission and the coil springs of the damper portion is set to be equal to or greater than 25% of an inertia of the entire torque fluctuation absorbing apparatus.

8. A torque fluctuation absorbing apparatus according to claim 1, wherein
the output shaft of the engine includes a first stepped shaft portion protruding therefrom towards the input shaft of the transmission,
an input-side member provided at a torque transmitting path to be established between the output shaft of the engine and the coil springs of the damper portion engages the first stepped portion,
the input shaft of the transmission includes a second stepped shaft portion protruding therefrom towards the output shaft of the engine, and
an output-side member provided at a torque transmitting path to be established between the input shaft of the transmission and the coil springs of the damper portion engages the second stepped shaft portion.

9. A torque fluctuation absorbing apparatus according to claim 1, wherein
the first plate member includes a first opening portion,
the second plate member includes a second opening portion,
and wherein a connecting member is allowed to pass through the first and second opening portions from a transmission side,
whereby an input-side member provided at a torque transmitting path to be established between the output shaft of the engine and the coil springs of the damper portion is connected to the output shaft of the engine by means of the connecting member.

10. A torque fluctuation absorbing apparatus according to claim 1, further comprising:
a first member assembled onto the output shaft of the engine; and
a second member assembled onto the first member by a connecting member,
wherein the connecting member is assembled onto the first and second members from an engine side for connecting the first and second members to each other.

11. A torque fluctuation absorbing apparatus according to claim 1, further comprising:
a first member assembled onto the output shaft of the engine; and
a second member assembled onto the first member by a connecting member,
wherein the first plate member includes a first opening portion,
the second plate member includes a second opening portion,
and wherein the connecting member is allowed to pass through the first and second opening portions from a transmission side for connecting the first and second members to each other.

12. A torque fluctuation absorbing apparatus according to claim 1, wherein
a predetermined component of the torque fluctuation absorbing apparatus includes a hole portion, and
a size of the hole portion is set to be smaller than a size of a connecting member for connecting an input-side member provided at a torque transmitting path to be established between the output shaft of the engine and the coil springs of the damper portion to the output shaft of the engine,
and wherein the connecting member is fixed to the output shaft of the engine for fixedly connecting the input-side member to the output shaft of the engine.

13. A torque fluctuation absorbing apparatus according to claim 1, wherein
the second plate member includes an accommodating portion for accommodating therein each coil spring, and
the accommodating portion includes a fluid-tight structure.

14. A torque fluctuation absorbing apparatus according to claim 13, wherein
a guide plate is provided at a radially outer side of each coil spring within the accommodating portion,
whereby the guide plate guides compressing and extending movements of each coil spring.

15. A torque fluctuation absorbing apparatus according to claim 1, further comprising:
a first member assembled onto the output shaft of the engine; and
a second member assembled onto the first member to be integral therewith before assembling the first member onto the output shaft of the engine,
wherein a connecting member connects the first and second members to the output shaft of the engine,
one of the first plate member and the second plate member includes a hole portion at a radially inner side position further than a position of the damper portion,
and wherein the connecting member is assembled onto the output shaft of the engine through the hole portion for connecting the first and second members to the output shaft of the engine.

16. A torque fluctuation absorbing apparatus according to claim 1, wherein
a connecting member for connecting an input-side member provided at a torque transmitting path to be established between the output shaft of the engine and the coil springs of the damper portion to the output shaft of the engine is assembled onto the input-side member before connecting the input-side member to the output shaft of the engine,
one of the first plate member and the second plate member includes a hole portion,
and wherein the connecting member is fixed to the output shaft of the engine for fixedly connecting the input-side member to the output shaft of the engine by means of a fixing tool allowed to pass through the hole portion from a transmission side.

17. The torque fluctuation absorbing apparatus according to claim 1, wherein each of the damper portion and the auxiliary damper portion possesses an end face facing the transmission in the axial direction, the face of the auxiliary damper portion being positioned closer to the transmission than the face of the damper portion.

18. A torque fluctuation absorbing apparatus, comprising:
a first plate member;
a second plate member including a first plate portion and a second plate portion to interpose therebetween the first plate member;
a damper portion allowing a relative rotation between the first and second plate members; and
an auxiliary damper portion provided at a torque transmitting path to be established between the damper portion and one of the first plate member and the second plate member at a position offset in an outer radial direction of the first and second plate members away from a position of the damper portion,
wherein the first plate member is connected to a first rotational shaft, the second plate member is connected to a second rotational shaft for outputting a rotation of the first rotational shaft from the torque fluctuation absorbing apparatus, and the auxiliary damper portion generates a spring force for absorbing a torque fluctuation generated between the first plate member and the second plate member, and the damper portion and the auxiliary damper portion are disposed at positions offset in an axial direction from each other, the auxiliary damper portion being closer to the second plate member than the damper portion in the axial direction.

19. A torque fluctuation absorbing apparatus according to claim 18, wherein an inertia of an output-side member provided at a torque transmitting path to be established between the damper portion and the second rotational shaft is greater than an inertia of an input-side member provided at a torque transmitting path to be established between the first rotational shaft and the damper portion.

20. A torque fluctuation absorbing apparatus according to claim 18, wherein the first and second plate portions of the second plate member interpose therebetween one of a radially inward portion and a radially outward portion of the first plate member.

* * * * *